US006850751B1

(12) United States Patent
Shiiba et al.

(10) Patent No.: US 6,850,751 B1
(45) Date of Patent: Feb. 1, 2005

(54) NON-RECIPROCAL CIRCUIT DEVICE, METHOD OF MANUFACTURING, AND MOBILE COMMUNICATION APPARATUS USING THE SAME

(75) Inventors: Kengo Shiiba, Miyazaki (JP); Munenori Fujimura, Miyazaki (JP); Hitoshi Uchi, Miyazaki (JP); Shuichiro Yamaguchi, Miyazaki (JP); Takayuki Takeuchi, Osaka (JP); Yasuhiko Horio, Osaka (JP); Hiroshi Kawano, Miyazaki (JP); Hiromi Tokunaga, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/522,233

(22) Filed: Mar. 9, 2000

(30) Foreign Application Priority Data

| | | |
|---|---|---|
| Mar. 9, 1999 | (JP) | 11-061317 |
| Mar. 11, 1999 | (JP) | 11-064483 |
| Mar. 11, 1999 | (JP) | 11-064484 |
| Jun. 3, 1999 | (JP) | 11-156149 |
| Dec. 8, 1999 | (JP) | 11-348445 |

(51) Int. Cl.[7] .............................. H04B 1/26; H04B 1/44
(52) U.S. Cl. ...................... 455/327; 455/78; 455/278.1; 333/1.1; 333/24.2
(58) Field of Search ................................ 455/326, 327, 455/73, 78, 550, 80, 82, 83, 90, 272, 278.1, 277.1; 333/1.1, 24.1, 24.2, 24; 370/278, 277

(56) References Cited

U.S. PATENT DOCUMENTS

| | | | | |
|---|---|---|---|---|
| 4,778,733 A | | 10/1988 | Lubrano et al. | |
| 4,812,787 A | * | 3/1989 | Kuramoto et al. | 333/1.1 |
| 4,920,323 A | * | 4/1990 | Schloemann et al. | 333/1.1 |
| 5,068,629 A | * | 11/1991 | Nishikawa et al. | 333/1.1 |
| 5,379,004 A | * | 1/1995 | Marusawa et al. | 333/1.1 |
| 5,620,543 A | * | 4/1997 | Marusawa et al. | 333/1.1 |
| 5,745,015 A | | 4/1998 | Tokudera et al. | |
| 5,994,974 A | * | 11/1999 | Makino et al. | 333/24.2 |
| 6,020,793 A | * | 2/2000 | Makino et al. | 333/1.1 |
| 6,222,425 B1 | * | 4/2001 | Okada et al. | 333/1.1 |
| 6,366,178 B1 | * | 4/2002 | Makino et al. | 333/1.1 |

FOREIGN PATENT DOCUMENTS

| | | |
|---|---|---|
| DE | 0 653 799 | 5/1995 |
| EP | 0 757 402 A1 | 2/1997 |
| EP | 0 821 426 A1 | 1/1998 |
| EP | 0 845 830 A1 | 6/1998 |
| JP | 62-230493 | 10/1987 |
| JP | 63-13689 | 1/1988 |
| JP | 3-84607 | 8/1991 |
| JP | 06196907 | 7/1994 |
| JP | 6-204711 | 7/1994 |
| JP | 6-239661 | 8/1994 |
| JP | 07007308 | 1/1995 |
| JP | 07106809 | 4/1995 |
| JP | 07-122909 A | 5/1995 |

(List continued on next page.)

*Primary Examiner*—Sonny Trinh
(74) *Attorney, Agent, or Firm*—RatnerPrestia

(57) ABSTRACT

A non-reciprocal circuit device has a length, a width, and a thickness denoted respectively by L1, L2, and L3, and the overall dimensions of 2.5 mm<L1<7.0 mm, 2.5 mm<L2<7.0 mm, and 1.0 mm<L3<3.5 mm. When a projected area of the substrate of the device is orthogonally projected on a plane parallel to a base surface of the substrate is denoted by S1, the substrate holds a proportional relation to S1/(L1×L2)=0.1 to 0.78. When a thickness of the magnet of the device is denoted by L4, the magnet holds a proportional relation of L4/L3=0.2 to 0.5. When a projected area of the magnet orthogonally formed on a plane parallel to a surface of the magnet is denoted by S2, they have a proportional relation of S1/S2=0.15 to 0.83.

27 Claims, 21 Drawing Sheets

FOREIGN PATENT DOCUMENTS

| | | | |
|---|---|---|---|
| JP | 07-263917 | A | 10/1995 |
| JP | 8-8613 | | 1/1996 |
| JP | 8-78911 | | 3/1996 |
| JP | 9-200276 | | 7/1997 |
| JP | 9-214210 | | 8/1997 |
| JP | 09307316 | | 11/1997 |
| JP | 09326604 | | 12/1997 |
| JP | 10-135711 | | 5/1998 |
| JP | 2000-151217 | | 5/2000 |

* cited by examiner

NON-RECIPROCAL CIRCUIT DEVICE, METHOD OF MANUFACTURING, AND MOBILE COMMUNICATION APPARATUS USING THE SAME

FIELD OF THE INVENTION

The present invention relates to a non-reciprocal circuit device for use in a mobile communication apparatuses such as an automobile telephone, a cellular phone, and the like that is operated mainly in a microwave frequency band. The invention also relates to a method of manufacturing this non-reciprocal circuit device, and a mobile communication apparatus using the same.

BACKGROUND OF THE INVENTION

Lumped-constant isolators have been used for terminal devices of a mobile communication apparatuses from early on, since they can be constructed in small size. An isolator is connected between a power amplifier and an antenna in a transmitter side of the mobile communication apparatuses, and used for such purposes as preventing back-flow of an extraneous signal into the power amplifier, stabilizing a load side impedance of the power amplifier, and so on.

There has been a strong demand for miniaturization of the isolator in itself as well as a reduction of insertion losses in order to restrain consumption of a battery, because of an expeditious tendency of downsizing the mobile communication apparatuses in recent years.

An ordinary structure of the lumped-constant isolators used widely in the latest terminal devices such as cellular phones will be described briefly by referring to FIG. 21.

Three sets of strip lines 61*a*, 61*b* and 61*c*, electrically insulated from one another, and multi-layered in a manner to cross with respect to each other at an angle of approximately 120 degrees, are disposed in contiguity to a ferrite substrate 62. A magnet 63 for magnetizing the ferrite substrate 62 is disposed in a position facing the ferrite substrate 62.

Capacitors 64*a*, 64*b* and 64*c* are connected individually in parallel with their respective strip lines 61*a*, 61*b* and 61*c*. Terminals of the strip lines 61*a* and 61*b* are connected to their respective input/output terminals 65*a* and 65*b*, and a terminal of the strip line 61*c* is connected to a termination resistor 66. The other ends of the individual strip lines are connected to a common circular ground plate 67, which is electrically connected to a ground frame 60 together with ground side electrodes of the three capacitors 64*a*, 64*b* and 64*c* and the resistor 66.

The ground frame 60 is then electrically connected to a lower enclosure 69 having a ground terminal for connection to the outside. In addition, an upper enclosure 68 is disposed as shown in the figure in order to house the ferrite substrate 62 and the magnet 63, and to constitute a part of a magnetic circuit in combination with the lower enclosure 69. The lower enclosure 69 is provided with windows 600 for adjusting circuit constants by trimming electrodes of the capacitors 64*a*, 64*b* and 64*c*.

In the past, the three sets of strip lines 61*a*, 61*b* and 61*c* have all been constructed in a straight form so that each of the strip lines intersects with one another at an angle of approximately 120 degrees on the ferrite substrate 62. Although not shown in the figure, each of the strip lines is assembled with an insulation sheet inserted between them in such a manner that they do not contact electrically with each other.

As reduction in size of the portable terminal devices advance lately, there arises an increasing demand for miniaturization of the isolators, and for preventing characteristics degradation of the isolators that might otherwise occur due to the miniaturization.

SUMMARY OF THE INVENTION

A non-reciprocal circuit device comprises: a substrate having magnetism; a magnet provided in a position facing the substrate; a strip line block provided in vicinity of the substrate, the strip line block comprising a plurality of strip lines electrically insulated from one another, and multi-layered together; a capacitor connected to the strip line block; and an enclosure for housing at least the substrate, the magnet, and the strip line block. This non-reciprocal circuit device is so constructed that, when a length, a width, and a thickness are denoted respectively by L1, L2, and L3, it has dimensions of $$2.5\text{ mm}<L1<7.0\text{ mm},$$

$$2.5\text{ mm}<L2<7.0\text{ mm, and}$$

$$1.0\text{ mm}<L3<3.5\text{ mm}.$$

Furthermore, when a projected area of the substrate orthogonally projected on a plane parallel to a base surface of the substrate is represented by S1, the substrate holds a proportional relation of $$S1/(L1\times L2)=0.1\text{ to }0.78\text{, and desirability between 0.1 and 0.5,}$$

when a thickness of the magnet is represented by L4, the magnet holds a proportional relation of $$L4/L3=0.2\text{ to }0.5\text{, and}$$

further that, when a projected area of the magnet orthogonally projected on a plane parallel to a surface of the magnet is represented by S2, their proportional relation is given by $$S1/S2=0.15\text{ to }0.83\text{, and desirability between 0.15 and 0.55.}$$

The non-reciprocal circuit device of the present invention is characterized by having at least a first strip line is constructed of a plurality of lines, among the plurality of strip lines, and at least one of the lines among the plurality of lines has a portion that is not parallel to the other lines.

With the above-described structure, the present invention is able to steadily provide non-reciprocal circuit devices of a small size, low loss, and small characteristic dispersion.

A method of manufacturing the non-reciprocal circuit devices comprises the steps of: providing a first insulating member on the first strip line among the plurality of strip lines; overlaying a second strip line on the first insulating member at a predetermined angle with respect to the first strip line; placing a second insulating member on the second strip line; overlaying a third strip line on the second insulating member at a predetermined angle with respect to the first and the second strip lines to form a strip line block; disposing a multi-layered portion of the strip line block on one of surfaces of the substrate, and mounting the strip line block on the other surface of the substrate in a manner that the strip lines do not overlap with each other; and housing the substrate bearing the strip line block into the enclosure.

The foregoing steps can manufacture superior non-reciprocal circuit devices having a small dispersion in electrical characteristics and quality of manufacturing.

Furthermore, a mobile communication apparatus comprises: at least one of a transmitting unit for converting at least one of a data signal and an aural signal into a transmission signal, and a receiving unit for converting a reception signal into at least one of a data signal and an aural signal; an antenna for transmitting and receiving the transmission signal and the reception signal; and a control unit for controlling at least the transmitting unit and the receiving unit, wherein the mobile communication apparatus including a non-reciprocal circuit device like the one described above is disposed positions between the antenna and the transmitting unit The foregoing structures can realize manufacturing of superior mobile communication apparatuses having a small dispersion in electrical characteristics and quality of manufacturing.

DESCRIPTION OF THE PREFERRED EMBODIMENTS

Detailed descriptions will be given hereinafter to cover an isolator as an example of a non-reciprocal circuit device of the preferred embodiments of the present invention. The following descriptions can also apply to a non-reciprocal circuit device.

First Exemplary Embodiment

Isolator of a first exemplary embodiment of the present invention will be described hereafter by referring to FIG. 1 through 6.

Figure 1:
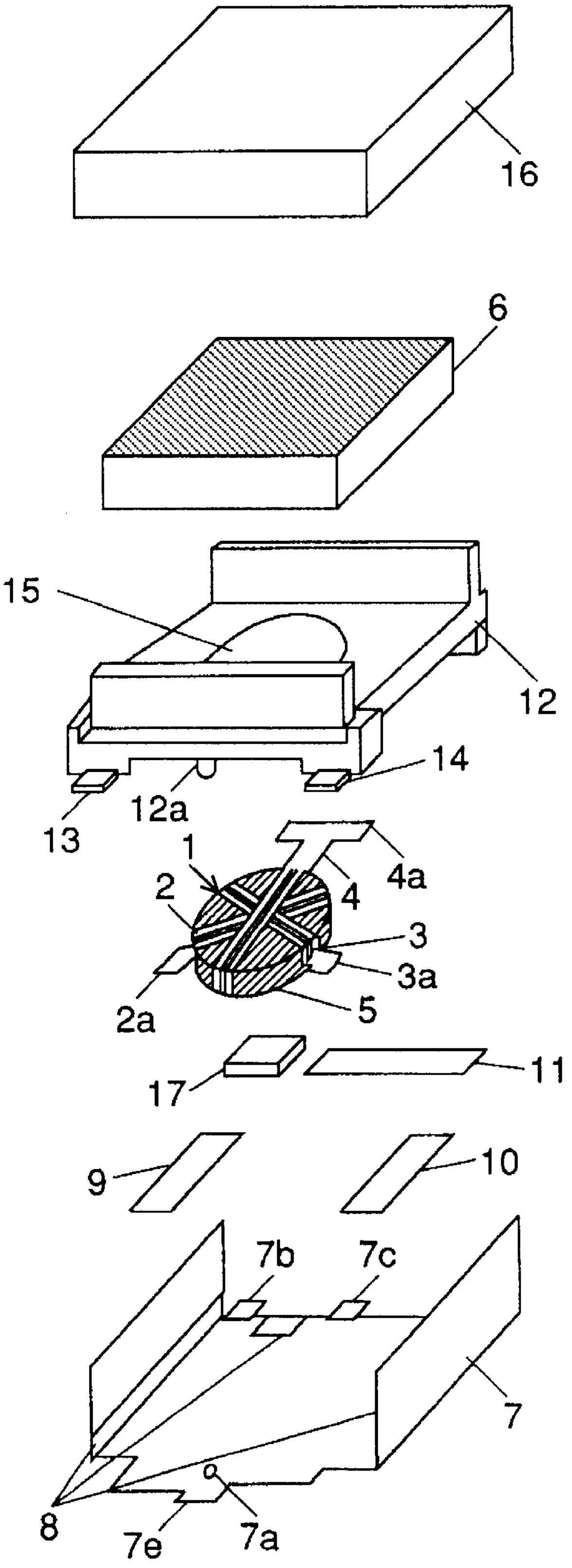
FIG. 1, is an exploded perspective view depicting a structure of an isolator of a first exemplary embodiment of the present invention.
Figure 2:
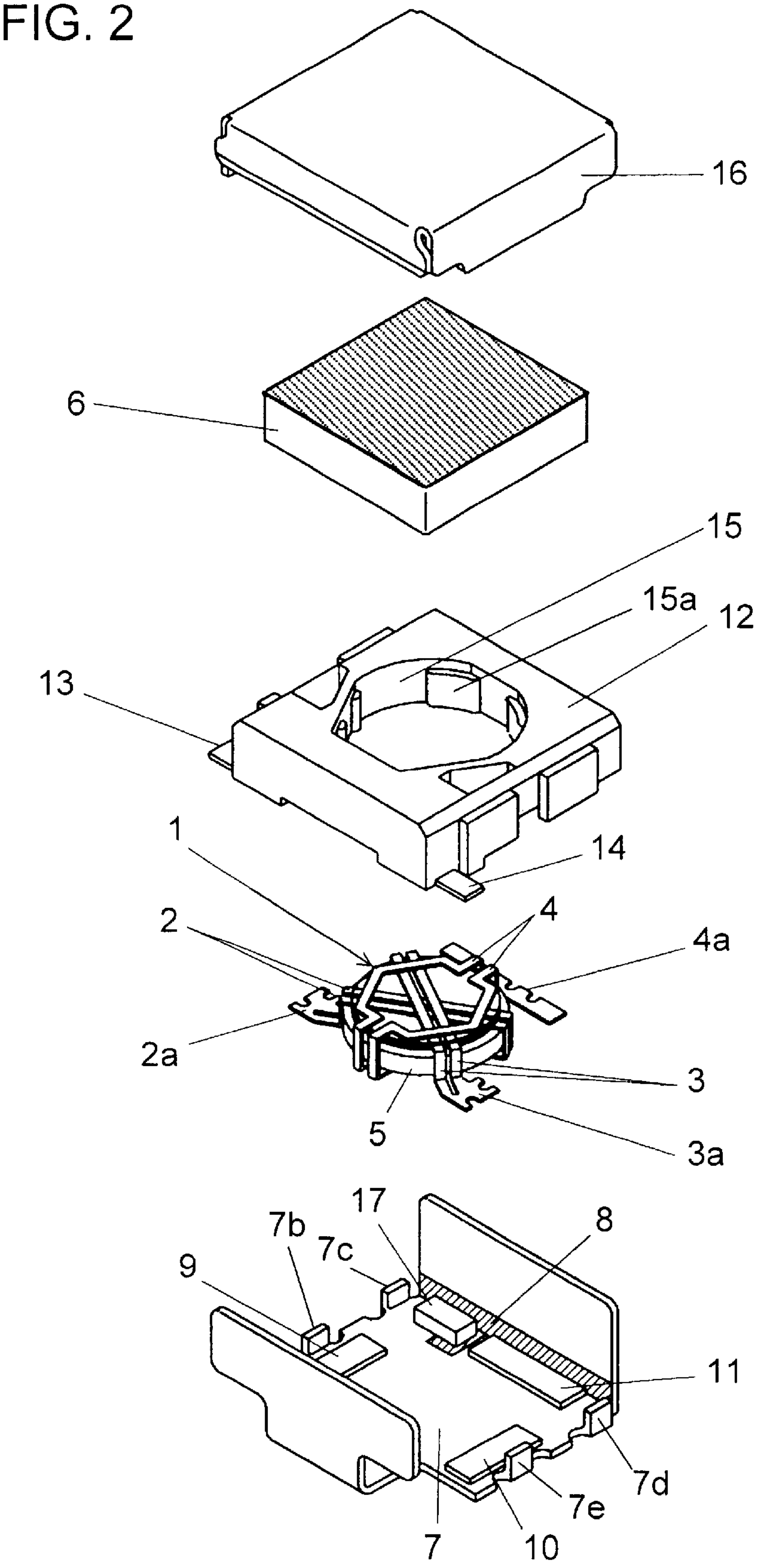
FIG. 2 is an exploded perspective view depicting an example of the other structure of the isolator of the first exemplary embodiment of the present invention.

FIG. 1 and FIG. 2 are exploded perspective views depicting structures of isolators of the present exemplary embodiment. Differences between an isolator of FIG. 1 and an isolator of FIG. 2 pertain primarily to strip line blocks 1, terminal bases 12, and lower enclosures 7. However, mutually corresponding constituent elements are assigned the same reference numerals in order to facilitate descriptions.

A strip line block 1 comprises a plurality of strip lines 2, 3 and 4. Ends of the strip lines 2, 3 and 4 are provided with their respective terminals 2_a_, 3_a_ and 4_a_.

The strip line block 1 is tightly attached along a top and side surfaces of a ferrite substrate 5. A magnet 6 generates magnetic field to the ferrite substrate 5. A lower enclosure 7 having a cross sectional shape of a letter U is provided with an insulator 8, and capacitors 9, 10 and 11 are individually mounted on it. At least one of electrodes of each of the capacitors 9, 10 and 11 is electrically bonded to the lower enclosure 7.

The terminals 2_a_, 3_a_ and 4_a_ of the strip line block 1 are bonded on the other side of the electrodes of the respective capacitors 9, 10 and 11.

A terminal base 12 is provided with terminals 13 and 14, and the terminals 2_a_ and 3_a_ of the strip line block 1 are electrically connected respectively to these terminals 13 and 14.

An upper enclosure 16 is open at one side facing the magnet 6.

One side of an electrode of a resistor 17 is bonded on the lower enclosure 7, and the terminal 4_a_ of the strip line block 1 is electrically connected to the other side of the electrode of the resistor 17. A lumped-constant isolator is constituted as described above.

A method of manufacturing the isolator of this exemplary embodiment will be described next.

As a first step, the capacitors 9, 10 and 11, and the resistor 17 are mounted on the lower enclosure 7 by bonding one side of their electrodes. The strip line block 1 is attached tightly around the top and the side surfaces of the ferrite substrate 5 in a manner of covering the ferrite substrate 5, and the ferrite substrate 5 is positioned to make a bottom surface of it in contact with the lower enclosure 7. The terminals 2*a*, 3*a* and 4*a* of the strip line block 1 are bonded to the other side of the electrodes of the respective capacitors 9, 10 and 11. The other electrode of the resistor 17 and the terminal 4*a* of the strip line block 1 are connected together.

The terminals 13 and 14 provided on the terminal base 12 are connected to the terminals 2*a* and 3*a* of the strip line block 1. During this step, the ferrite substrate 5 bearing the strip line block 1 is inserted in a through hole 15 of the terminal base 12 in a manner of surrounding the ferrite substrate 5. The terminal base 12 is fixed by being jammed in the lower enclosure 7, in a manner of holding bonded portions between the other electrodes of the capacitors 9, 10 and 11 and the terminals 2*a*, 3*a* and 4*a* of the strip line block 1. The magnet 6 is bonded with adhesive to the upper enclosure 16.

The isolator is completed, when the upper enclosure 16 adhesively bonding the magnet 6 is covers the terminal base 12. All of the bonding and connections described above are made using ordinary methods such as soldering connection, bonding with electrically conductive adhesive, welding, and the like.

Figure 3A:
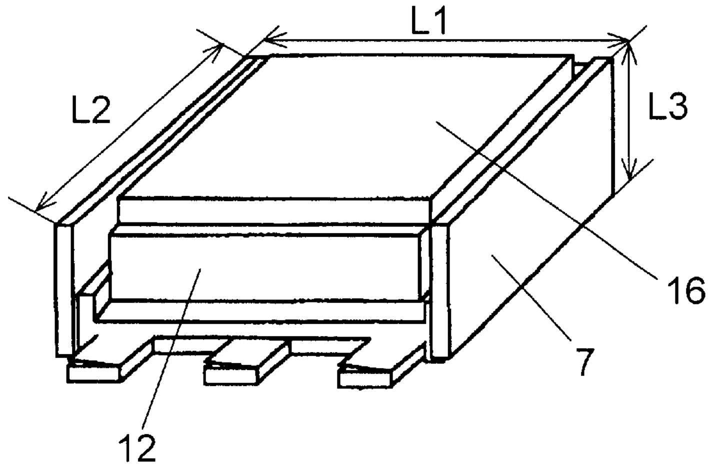
FIG. 3A is a perspective view depicting dimensions of the isolator of the first exemplary embodiment of the present invention.
Figure 3B:
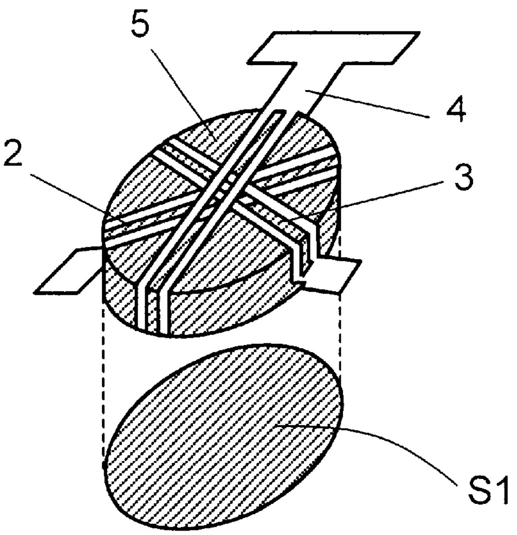
FIG. 3B is a perspective view depicting dimensions of a substrate having magnetism used in the isolator of the first exemplary embodiment of the present invention.
Figure 3C:
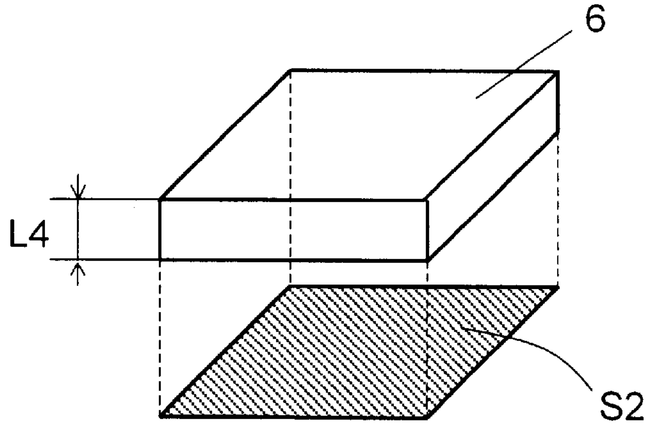
FIG. 3C is a perspective view depicting dimensions of a magnet used in the isolator of the first exemplary embodiment of the present invention.

Referring now to FIGS. 3A through 3C, a dimensional relation of the isolator and its constituent elements of the present invention will be described.

It is desirable to make the isolator of this exemplary embodiment to have external dimensions as specified below, in order to adapt for downsizing of the latest mobile communication apparatuses.

When a length, a width and a thickness of the isolator are denoted respectively as L1, L2 and L3, as shown in FIG. 3A, it is desirable that they have dimensions of:

- 2.5 mm<L1<7.0 mm (and more preferably, 3.7 mm<L1<6.3 mm);
- 2.5 mm<L2<7.0 mm (and more preferably, 3.7 mm<L2<6.3 mm); and
- 1.0 mm<L3<3.5 mm (and more preferably, 1.3 mm<L3<2.5 mm), respectively.

If the dimensions of L1 and L2 need to be 2.5 mm or less, each and every element constituting the isolator must be made so small that they reduce productivity and make it difficult to attain the desired characteristics.

If the dimensions L1 and L2 exceed 7.0 mm, the isolator becomes too large, making it difficult to mount in a mobile communication apparatus of a reduced size.

If the dimension of L3 needs to be 1.0 mm or less, every element constituting the isolator must be made very thin that they also reduce productivity and make the desired characteristics not attainable.

Furthermore, if the dimension of L3 exceeds 3.5 mm, the isolator becomes too thick, thereby making it difficult to reduce a thickness of the mobile communication apparatus.

Describing hereinafter are conditions desirable for dimensions of the individual constituent elements used in the isolator having the aforementioned external dimensions.

Describing first will pertain to a first area ratio S1/(L1×L2).

It is desirable to restrict a size of the ferrite substrate 5 so as to keep the first area ratio S1/(L1×L2) in a range of 0.1 and 0.78, between a projected area S1 of the ferrite substrate 5 orthogonally projected on a plane parallel to a base surface of the ferrite substrate 5 as shown in FIG. 3B and an area L1×L2 of the isolator. An upper limit of the first area ratio S1/(L1×L2) becomes π/4=0.78, as it is determined by the ferrite substrate 5, which is inscribed to the isolator, on a premise that the ferrite substrate 5 is of a circular shape, and the isolator is of a regular square shape.

A lower limit of the first area ratio S1/(L1×L2) is determined by an insertion loss, which is an important characteristic among those of the isolator. The isolators have so far been miniaturized at the expense of the insertion loss, since demand of the miniaturization has continued with the trend toward smaller size and lighter weight of the cellular phones. As a result, the insertion loss has tended to increase to satisfy miniaturizing a size of the ferrite substrate 5. In its operation, the isolator outputs high frequency signals by transferring them through an interior of the ferrite substrate 5. Therefore, if the area S1 of the ferrite substrate 5 is so small, a magnetic filling factor in the ferrite substrate 5 decreases and an insertion loss of the isolator increases. For an isolator in a size of L1 L2=5 mm, for instance, an insertion loss of 0.5 dB or greater is required. It is considered to be desirable that the isolator satisfies a condition of the first area ratio S1/(L1×L2)≧0.25, in order to achieve it. Since there is a continued tendency of further demand of miniaturization of the isolators, an insertion loss of 0.5 dB or less may be tolerated. It is conceivable that the first area ratio S1/(L1×L2)≧0.1, if an insertion loss of, for instance, up to 1 dB is assumed to be tolerable.

It is more desirable if the first area ratio S1(L1×L2) is 0.1 to 0.5. A reason for the upper limit of 0.5 is that it can provide a necessary space within the isolator of even a small size, and increases a degree of flexibility for an area and a thickness of the capacitor to be mounted in the isolator, if the first area ratio is 0.5 or less, thereby ensuring productivity.

Describing next will pertains to a thickness ratio L4/L3.

It is desirable to limit a thickness L4 of the magnet 6 with respect to the thickness L3 of the isolator so that a thickness ratio L4/L3=0.2–0.5, when the thickness of the magnet 6 is denoted by L4, as shown in FIG. 3C. It is also desirable that the magnet 6 produces a magnetic flux density of 30 mT to 80 mT. The upper case 16, the lower case 7, the ferrite substrate 5, the magnet 6, and the like are the constituent elements that determine a dimension in a direction of the thickness of the isolator, as shown in FIG. 1 and FIG. 2. A thickness of the ferrite substrate 5 and the thickness L4 of the magnet 6, in particular, share a larger proportion of the thickness L3 of the isolator. The thickness of the ferrite substrate 5 and the thickness L4 of the magnet 6 have such a relation that if the thickness L4 of the magnet 6 is increased to the ratio L4/L3>0.5, the thickness of the ferrite substrate 5 must be reduced. Reduction of the thickness of the ferrite substrate 5 decreases a magnetic filling factor, and increases an insertion loss of the isolator, thereby making it difficult to ensure the most important characteristics among characteristics of the isolator. It is desirable for this reason that the thickness ratio L4/L3=0.5 is taken as an upper limit.

A lower limit of the thickness ratio L4/L3 is also determined by the insertion loss of the isolator. If the thickness L4 of the magnet 6 is reduced to an extent where the thickness ratio L4/L3<approximately 0.2, it makes the magnet 6 difficult to generate the desired magnetic field to the ferrite substrate 5. As a result, a reflection characteristic impedance of the isolator decreases, a reflection loss increases, and the insertion loss also increases. In addition, if the thickness L4 of the magnet 6 is reduced, it allows an unnecessary space to the ferrite substrate 5, causing a distribution of the magnetic field inside of the ferrite substrate 5 not to cross orthogonally to the surface of the ferrite substrate 5, but rather obliquely. This results in an increase of the insertion loss, since the high frequency signal can not be transmitted sufficiently through the ferrite substrate 5.

A reason for taking the magnetic flux density of 30 mT to 80 mT for the magnet 6 in the foregoing disclosure will be described hereinafter. If the magnetic flux density of the magnet 6 is less than 30 mT, the reflection characteristic impedance of the ferrite substrate 5 decreases. This, in turn, increases the reflection loss, and thereby the insertion loss of the isolator increases. On the contrary, if the magnetic flux density of the magnet 6 is greater than 80 mT, the reflection characteristic impedance increases. This also increases the reflection loss, and therefore increases the insertion loss of the isolator. Accordingly, it is desirable to maintain the magnetic flux density of the magnet 6 between 30 mT and 80 mT.

A second area ratio S1/S2 will be described next.

It is desirable to restrict areas of the ferrite substrate 5 and the magnet 6, in a manner of maintaining the second area ratio S1/S2 is 0.15 to 0.83, for a relation between a projected area S2 of the magnet 6 orthogonally projected on a plane parallel to a surface of the magnet 6 as shown in FIG. 3C and the projected area S1 of the ferrite substrate 5.

A lower limit of the second area ratio S1/S2 is explained. The area ratio S1/S2 takes a minimum value when S1 is the smallest and S2 is the largest. The magnetic field generated by the magnet 6 crosses the surface of the ferrite substrate 5 orthogonally, if the ferrite substrate 5 is sufficiently smaller than the magnet 6. This relation takes place, for example when the both dimensions L1 and L2 are 7 mm. A maximum value of the area S2, under this condition, becomes the product of approximately 0.89 and L1*L2, when consideration is made of the productivity and a thickness of the upper enclosure 16 serving as a yoke of the magnet 6. With regard to a minimum value of S1, a diameter of the ferrite substrate 5 becomes approximately 2.9 mm, upon consideration of an insertion loss required when the dimensions L1 and L2 are 7 mm. The area ratio S1/S2, when calculated according to the foregoing figures becomes approximately 0.15. A problem may arise due to degradation of the insertion loss, if the diameter of the ferrite substrate 5 is reduced below 2.9 mm. However, the dimensions L1 and L2 are not necessarily be 7 mm, but they may be reduced to 5 mm without any problem, so long as the ferrite substrate 5 has an approximate diameter of 2.9 mm.

Figure 22:
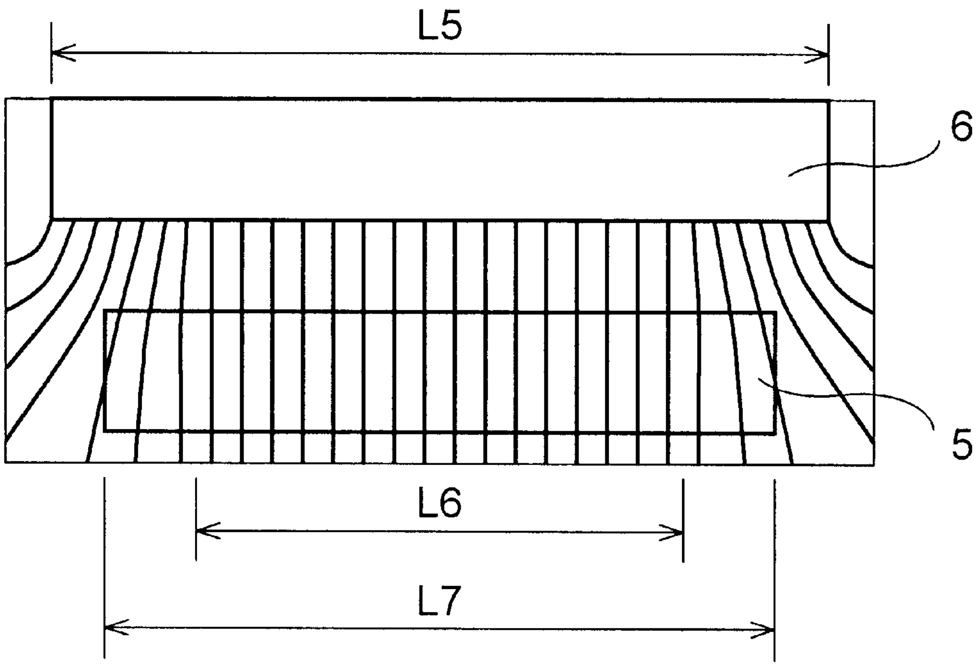
FIG. 22 illustrates a domain L6, wherein magnetic field generated by a magnet having a dimension L5 crosses orthogonally to a surface of a ferrite substrate, and the region L7 in the magnetic field where the isolator sufficiently functions.

An upper limit of the second area ratio S1/S2 is explained. A value of the area ratio S1/S2 becomes largest, when both the ferrite substrate 5 and the magnet 6 have the same type of shape (e.g. circular plate vs. circular plate, or square plate vs. square plate). It is necessary for the magnetic field to orthogonally cross the surface of the ferrite substrate 5 when determining an upper limit of the second area ratio S1/S2. As shown in FIG. 22, a ratio L7/L5 becomes approximately 0.91, when consideration is given on a domain wherein the magnetic field crosses the ferrite substrate 5 substantially orthogonally. This ratio is equivalent to the area ratio S1/S2 in a value of 0.83. Here L7 shows the region in the magnetic field where the isolator sufficiently functions.

A value of 0.55 is a more preferable upper limit of the second area ratio S1/S2 for the following reason. With a dimension of the domain L6, where the magnetic field generated by the magnet 6 having the dimension L5 crosses the ferrite substrate 5 in a direction orthogonal to the surface of the ferrite substrate 5, as shown in FIG. 22, a ratio L6/L5 of 0.74 is obtained. This ratio is equivalent to approximately 0.55 in the second area ratio. Although distribution of the magnetic field varies depending upon strength of the magnet 6 and the thickness L4 of the magnet 6, the above value was derived from a typical model of the exemplary embodiment.

Individual elements constituting the isolator of the present invention will now be described in detail hereinafter.

Described first will be the strip line block 1.

Figure 4:
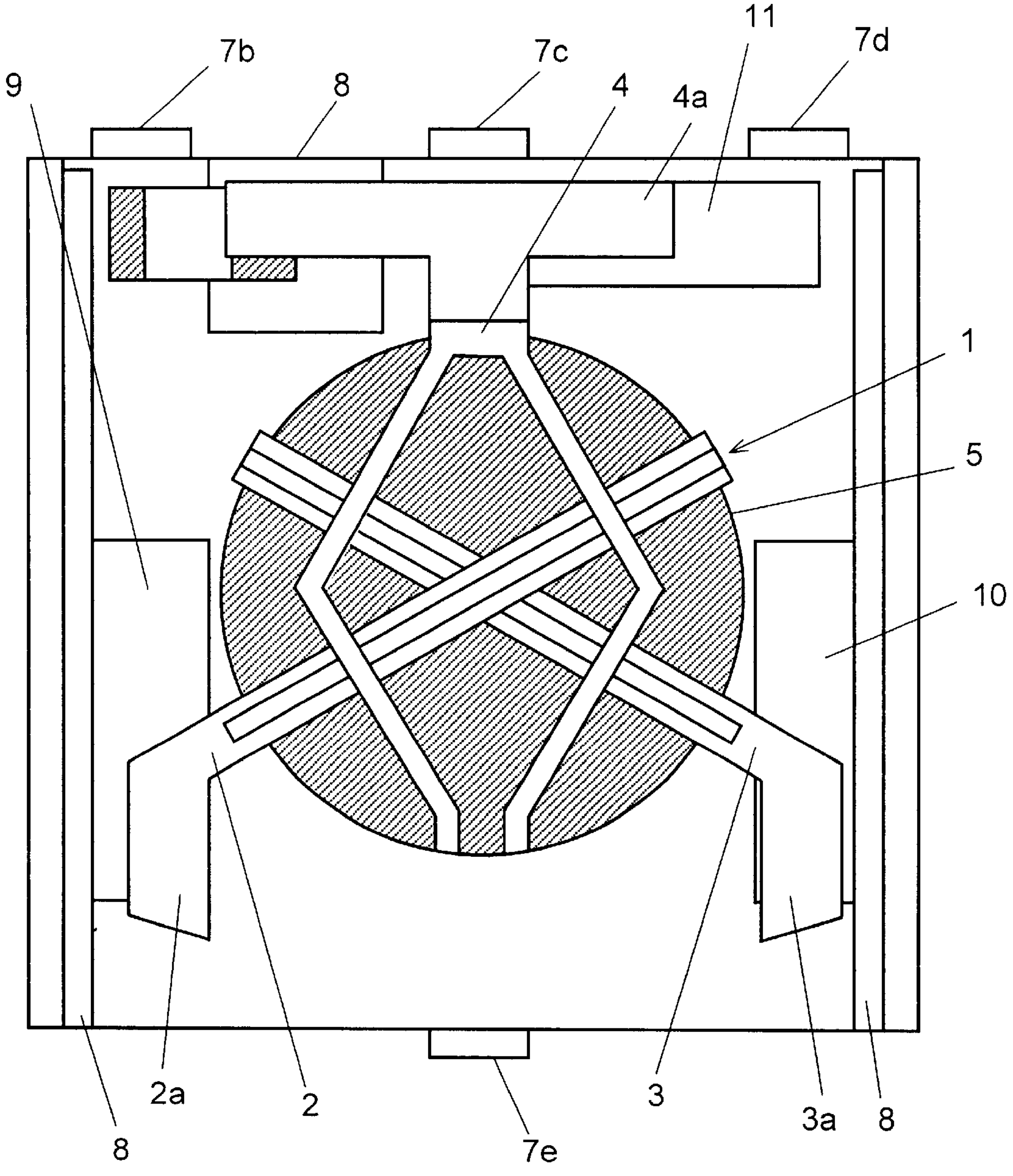
FIG. 4 is a plan view depicting internal components of the isolator of the first exemplary embodiment of the present invention.
Figure 5:
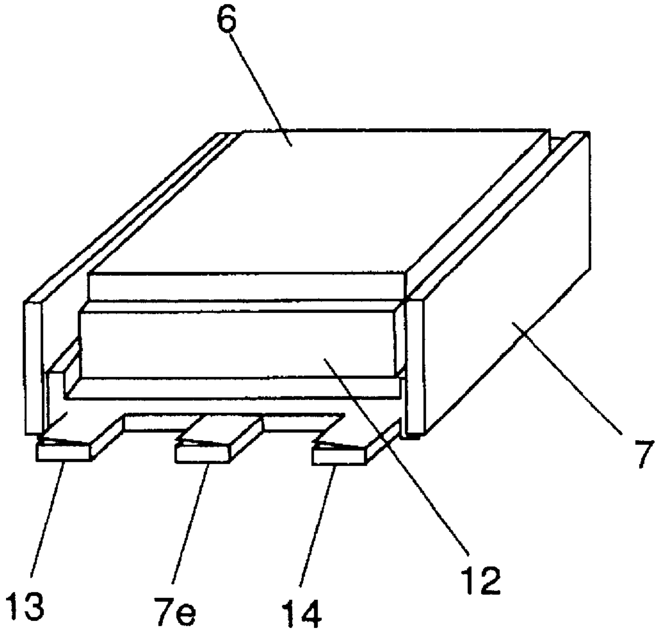
FIG. 5 is a perspective view of the isolator of the first exemplary embodiment of the present invention.

Each of the strip lines constituting the strip line block 1 is made in a sheet-form of a predetermined shape, as shown in FIG. 4, using metal such as copper, gold, silver and the like material. Advantages may be obtained regarding electrical characteristics, workability and cost, by using a material such as copper, copper alloy, and copper containing a certain amount of additive. In the present exemplary embodiment, although the strip line block 1 is constructed into a sheet-form, it may be constructed using a wire-form material.

In addition, two lines constituting a pair of strip-line 4 may be expanded to form them not parallel to each other, as shown in FIG. 4, so as to improve the characteristics, as will be described later.

In the present exemplary embodiment, the strip line block 1 is disposed in place by attaching it around the ferrite substrate 5 in order to reduce a space. However, other structures may also be adoptable, such as that the strip line block 1 is disposed contiguously to the ferrite substrate 5, after inserting an insulation sheet on one of its surfaces. In addition, each of the terminals 2*a*, 3*a* and 4*a* of the strip lines 2, 3 and 4 may be provided with a slit in order to facilitate a flow of solder when making connections with the capacitors 9, 10 and 11. Although not shown in the figure, an insulation sheet is provided between adjacent two of the strip lines 2, 3 and 4 making them electrically insulated. The insulation sheet can be of any shape including, but not limited to, a circle and a polygon, so long as it ensures a sound insulation between the strip lines.

Material used for the strip lines 2, 3 and 4 may preferably be a foil of rolled copper in a thickness of 25 $\mu$m to 60 $\mu$m. The strip line thinner than 25 $\mu$m is liable to break, and reduces productivity. On the other hand, a strip line thicker than 60 $\mu$m is not suitable with respect to reduction in thickness of the isolator. It is also desirable to plate the foil of rolled copper with an electrically conductive metal such as silver, gold, and the like in a thickness of 1 $\mu$m to 5 $\mu$m. The plating can increase an electrical conductivity through a surface of the strip lines, thus improving electrical characteristics such as a reduction of the insertion loss.

The strip line block 1 can be altered into a variety of forms, as will be described later. Among structures conceivable for the strip line block 1 are such that the strip lines 2, 3 and 4 are formed integrally into a shape of a letter Y, or that three separately constructed strip lines 2, 3 and 4 which are made of different members are bonded at predetermined angles with respect to each other. Both ends of the individual strip lines 2, 3 and 4 are bent along side surfaces of the ferrite substrate 5.

The ferrite substrate 5 will be described next.

Although the ferrite substrate 5 may take any shape such as a circular plate, a square plate, an elliptical plate, a polygonal plate, and so on, it is desirable to use either a circular plate or a hexagonal plate in view of a characteristics merit, etc. A desirable material for the ferrite substrate 5 is a magnetic material containing Fe (iron), Y (yttrium), Al (aluminum), Gd (gadolinium), and the like.

Edges of the ferrite substrate 5 may be rounded before attaching the strip line block 1 around the ferrite substrate 5, in order to prevent the strip line block 1 from being broken and suffering a characteristics degradation, and so on.

Describing next pertains to dimensions of the ferrite substrate 5.

It is desirable to form the ferrite substrate 5 into a thickness of 0.2 mm to 0.8 mm (and particularly preferable, if between 0.3 mm and 0.6 mm) in view of the characteristics and strength. If the ferrite substrate 5 has a shape of a circular plate, for example, it is preferable to form it into a diameter of 1.6 mm to 3.5 mm (and particularly preferable, if between 2.0 mm and 2.9 mm), in view of the miniaturization and characteristics.

The ferrite substrate 5 can provide an advantage in respect of the characteristics and miniaturization of the isolator, if it has a diameter of 1.6 mm or greater in the case of a circular plate, or if it has a longitudinal side of 1.6 mm or longer but shorter than any of the dimensions L1 and L2 in the case of a rectangular shape. If the diameter or a length of the longitudinal side of the ferrite substrate 5 is 1.6 mm or less, the magnetic filling factor within the ferrite substrate 5 decreases, and the insertion loss of the isolator increases, thereby making it difficult for the isolator to exert the demanded characteristics. In addition, the diameter of the ferrite substrate 5, if of a circular plate, needs to be smaller than any of the length L1 and the width L2 of the isolator, and each side of the ferrite substrate 5, if of a square shape, needs to be smaller than the corresponding one of the length L1 and the width L2, in order to make the ferrite substrate 5 storable in the isolator.

If the ferrite substrate 5 has a diameter or a length of the longitudinal side of 3.5 mm or greater, it makes miniaturization of the isolator difficult to achieve. It makes mounting work of the constituent elements into an isolator especially difficult, and reduces productivity, in the case of the isolator designed to have both of the L1 and L2 of no greater than 7 mm.

Accordingly, it is desirable for the ferrite substrate 5 to have a diameter or a length of the longitudinal side in a range of 1.6 mm and 3.5 mm. Furthermore, in the case of an isolator having both of the L1 and L2 of not greater than 5 mm, a more desirable dimension for the diameter or the length of the longitudinal side of the ferrite substrate 5 is between 2.0 mm and 2.9 mm, since the isolator can satisfy an insertion loss of 0.6 dB or less.

The ferrite substrate 5 can be formed into a desirable thickness, and thereby characteristic dispersion can be reduced, by subjecting both of its major surfaces to polishing.

The magnet 6 will be described next.

The magnet 6 is required to provide a magnetic flux density large enough to apply a sufficient magnetic field to the ferrite substrate 5, and it is desirable to use orientational strontium-base ferrite as the magnet material.

It is desirable that the magnet 6 is larger than the ferrite substrate 5, and that the ferrite substrate 5 preferably occupies an area within a projected area of the magnet 6. The magnet 6 can provide a magnetic field uniformly over the ferrite substrate 5, if the magnet 6 and the ferrite substrate 5 are disposed concentrically, and thereby the isolator provides a superior characteristic.

The magnet 6 may take such a shape as a circular plate, a square plate, an elliptical plate, a polygonal plate, and so on. A magnet formed into a square plate, especially if the ferrite substrate 5 has a shape of circular plate, can give a uniform magnetic field to the ferrite substrate 5. It also facilitates positioning of the magnet 6.

It is desirable to form the magnet 6 into a thickness of 0.2 mm to 1.5 mm in view of a reduction in thickness and obtaining a proper density of the magnetic flux.

The lower enclosure 7 will be described next.

The lower enclosure 7 is constructed of a magnetic material having a good electrical conductivity. In particular, a magnetic metal of good electrical conductivity, containing copper, silver, iron, etc. is suitable for use.

In addition, the magnetic metal may be plated with a metallic material of good electrical conductivity such as silver, gold, or the like in a thickness of 1 μm to 5 μm, in order to improve electrical characteristics and effectiveness of bonding with other elements.

The insulator 8 is placed on a side surface of the lower enclosure 7 at an electrically hot terminal side of the resistor 17 and where the capacitors 9 and 10 stay closely to the lower enclosure 7. This insulator 8 is formed by placing an adhesive sheet or a non-adhesive sheet, or by printing insulating material such as thermosetting resin, or the like method.

The capacitors 9, 10 and 11 will now be described.

A dielectric substrate used for the capacitors 9, 10 and 11 shall preferably have a relative dielectric constant of 20 or greater, which makes the capacitors 9, 10 and 11 of thin structure, and thereby helping to miniaturize the isolator element.

Electrode material used for the electrodes to be formed on both surfaces of the dielectric substrate is selected from at least one among gold, silver, copper and nickel.

An outer shape of the capacitors as viewed from the above shall desirably be a square shape, which offers an advantage in respect of mounting and positioning. However, a circular shape and an elliptic shape are also expedient.

The terminal base 12 will be described next.

The terminal base 12 is provided with the through hole 15, as shown in FIG. 1 and FIG. 2. The terminal base 12 houses the ferrite substrate 5 in the through hole 15 in such a manner that the terminal base 12 surrounds a periphery of the ferrite substrate 5. In addition, although the terminal base 12 surrounds two sides of a periphery of the magnet 6 confronting the ferrite substrate 5, as shown in FIG. 1, it may be so constructed to surround all four peripheral surfaces of the magnet 6. As has been described, a distinctive feature of the terminal base 12 of the present exemplary embodiment is that it has an encasement structure for surrounding at least one of the ferrite substrate 5 and the magnet 6. The terminal base 12 also has such a feature of not necessitating a separate holding member for holding various components, and helping to achieve miniaturization of the device, since the terminal base 12 holds bonded portions between the terminals 2*a*, 3*a* and 4*a* of the strip line block 1 and the capacitors 9, 10 and 11, as well as a bonded portion between the terminal 4*a* and the resistor 17.

Figure 6:
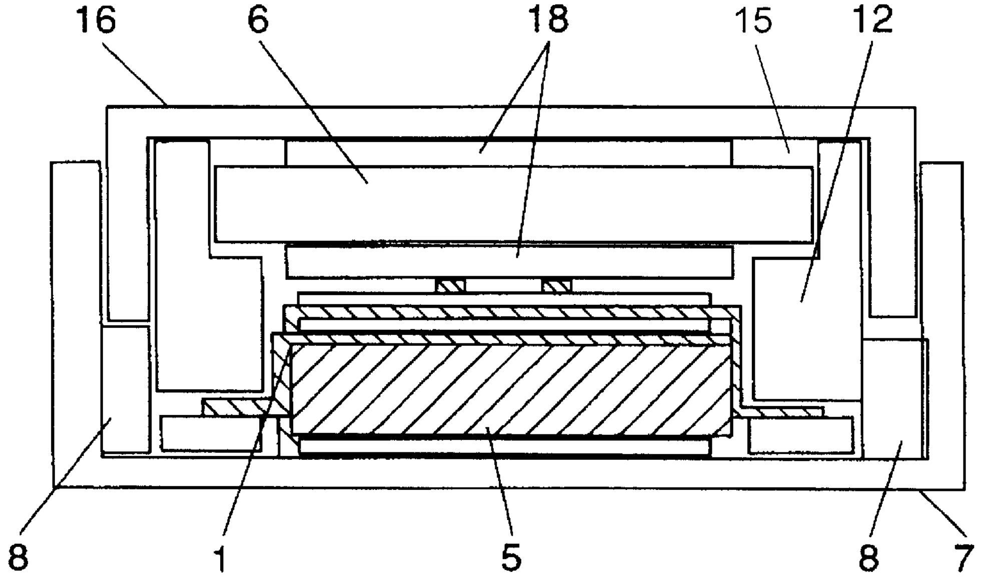
FIG. 6 is a sectional side view of the isolator of the first exemplary embodiment of the present invention.

In addition, there provides either bumps 15*a* on an inner surface of the through hole 15 for fixing the individual strip lines, and maintaining their intersecting angle, as shown in FIG. 2, or a step on an interior wall of the terminal base 12, as shown in FIG. 6, in order to facilitate rigid positioning of the ferrite substrate 5 and the magnet 6 precisely and readily. Furthermore, insert molding of the input/output terminals 13 and 14 at the same time of molding the terminal base 12 helps miniaturizing the isolator further, and facilitates manufacturing.

The terminal base 12 is formed with insert molding using a non-conductive material such as plastic resin, e.g. epoxy resin, liquid crystal polymer, and so on, ceramic, and the like, together with the terminals 13 and 14 simultaneously.

The terminals 13 and 14 are made of electrically conductive material such as phosphor bronze, brass, and the like. It is desirable to plate over a surface of the conductive material with good conductor such as silver. The terminals 13 and 14 are constructed with a process of bending, etc., of a sheet form conductor.

It is also preferable to compose the terminal base 12 of a material having a heat resistance to 250° C. or higher temperature, or more preferably to 290° C. or higher, since there is a high probability of it being heated when the isolator is mounted on another circuit board with bonding material. There is a tendency these days of using lead-free solder as the bonding material, and the material normally used has a melting point of approximately 240° C. In this case, the terminal base 12 could melt during the mounting process of the isolator, ending up in a trouble, unless a material resistive to a high temperature of at least 250° C. is used, since a temperature surrounding the circuit board reaches to 250° C. to 260° C. when mounting the isolator on the circuit board. Liquid crystal polymer is one of the materials having a heat resistance to 250° C. or higher. Although liquid crystal polymers melt at 250° C., they retain their shapes if no external force is imposed.

The terminal base 12 is disposed in a manner to hold the terminals 2*a* and 3*a* between the capacitors 9 and 10 and its own terminals 13 and 14, as shown in FIG. 1 and FIG. 2, and it is secured at least to the lower enclosure 7 with bonding material or jamming.

The lower enclosure 7 is provided with a pit or a through hole 7*a*, and the terminal base 12 is provided with a protrusion 12*a* to fit in the pit or the through hole 7*a*, as shown in FIG. 1, in order to facilitate positioning of the terminal base 12. The protrusion 12*a* and the pit or the through hole 7*a* may be reversed of their relative positions. In other words, a pit or a through hole may be provided in the terminal base 12, and a protrusion may be provided on the lower enclosure 7.

It is desirable for the terminal base 12 not to bear any terminals and electrode patterns other than the terminals 13 and 14, in order to keep it small and light.

In the present exemplary embodiment, although the terminals 13 and 14 are disposed by insert molding on the terminal base 12 composed of resin or the like, these terminals 13 and 14 may be glued with adhesive material on the terminal base 12.

Alternatively, the terminals 13 and 14 may be mechanically fixed by folding a connecting lug or the like provided on the terminal base 12. In this case, the terminals 13 and 14 may be glued additionally with adhesive or the like.

Moreover, although in the present exemplary embodiment, the terminals 13 and 14 are made of a sheet-formed conductor such as metal with a process of bending, etc., the terminals 13 and 14 can be formed into thin film on the terminal base 12 with a thin film deposition technique such as plating and sputtering etc. In this instance, the terminals 13 and 14 may be formed on a surface of the terminal base 12, or they may be formed inside of the terminal base 12 with portions of them exposed on the surface of the terminal base 12.

The lower enclosure 7 and the upper enclosure 16 will be described now.

It is desirable to construct the lower enclosure 7 with a metallic material having electric conductivity. Rolled steel is used in this exemplary embodiment. It is also desirable to form a plated film of metal such as silver, copper or the like in a thickness of 1 to 5 μm over the rolled steel, in order to further improve electrical characteristics. Beside the aforementioned pit or the through hole 7*a*, the lower enclosure 7 is provided with projections 7*b*, 7*c*, 7*d* and 7*e* at its peripheral edge, and any of these projections 7*b*, 7*c*, 7*d* and 7*e* may be used as a ground terminal.

The strip line block 1 is bonded on the lower enclosure 7 with an electrically conductive bonding material such as solder, conductive paste, and the like.

Figure 21:
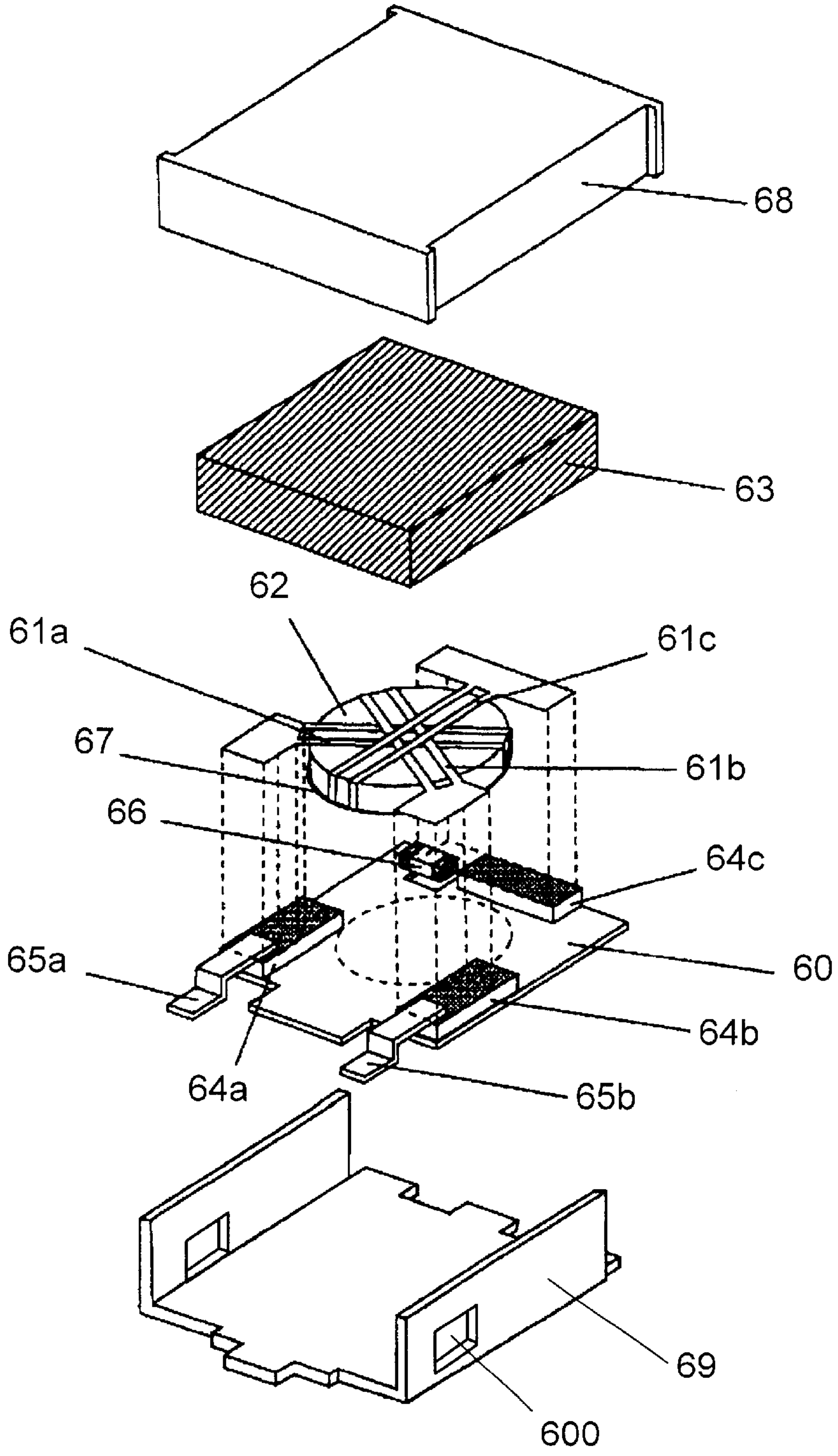
FIG. 21 PRIOR ART
FIG. 21 is an exploded perspective view depicting a structure of an isolator of the prior art.

The lower enclosure 7 is constructed into a shape of a letter U in its cross-section, and it bears no windows, etc. for an adjustment purpose, which are common to the conventional device as shown in FIG. 21.

The upper enclosure 16 is also constructed of a material similar to the lower enclosure 7, and neither does it bear adjustment windows, etc.

The upper enclosure 16 houses at least the magnet 6, or together with the terminal base 12 by bonding it with adhesive.

Second Exemplary Embodiment

A strip line block for the isolator of a second exemplary embodiment of the present invention will be described now by referring to FIG. 7.

A strip line block 1 is disposed in a manner to surround the ferrite substrate 5. The strip line block 1 is composed of strip lines 2, 3, and 4.

The strip lines 2, 3, and 4 are bent along a back surface and a side surface of the ferrite substrate 5, and they intersect with each other on a top surface of the ferrite substrate 5.

Although each of the strip lines 2, 3, and 4 is composed of a pair of lines serving as one strip line, it may be composed of a plural number of lines.

Figure 7:
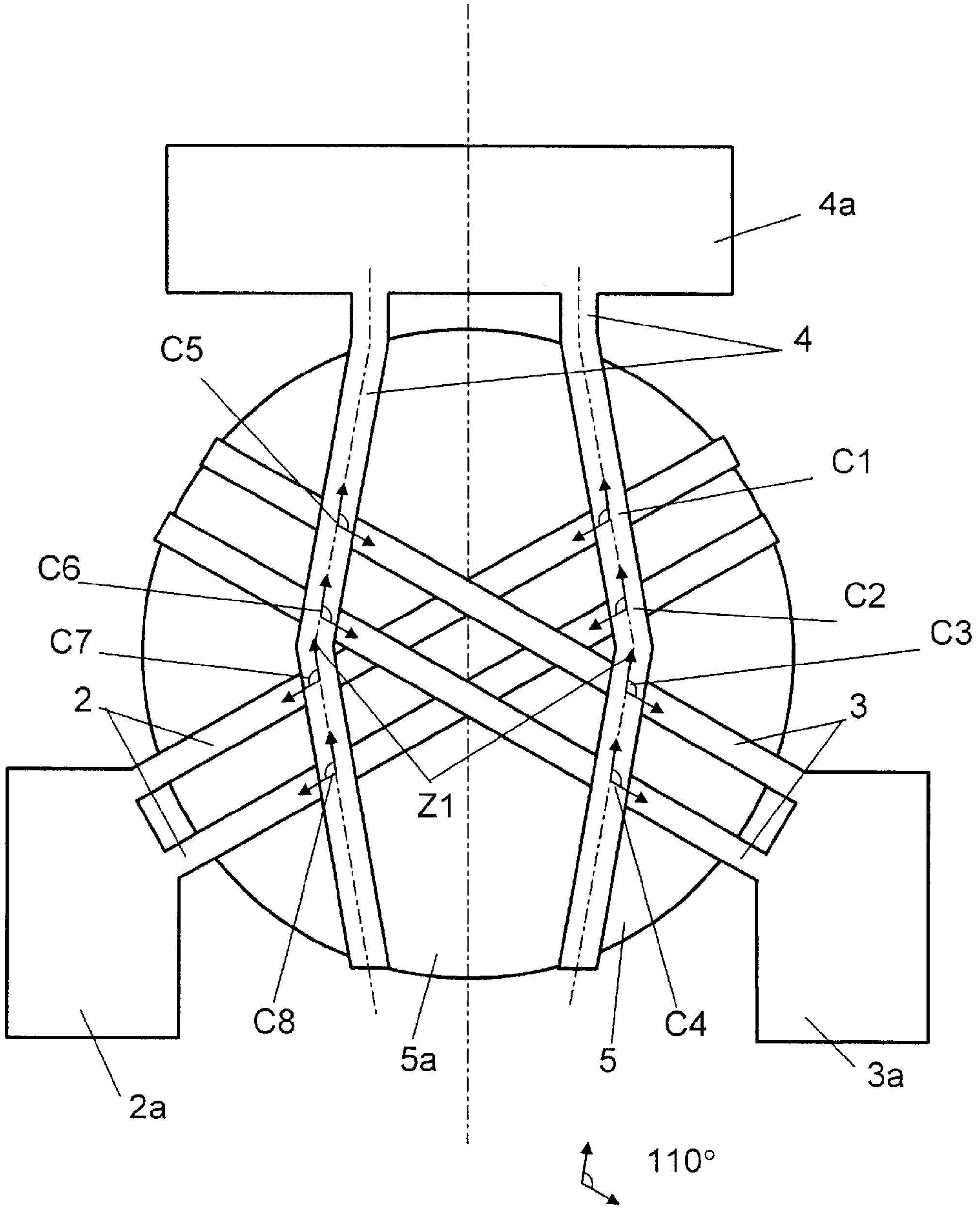
FIG. 7 is a plan view of a strip line block of an isolator of a second exemplary embodiment of the present invention.

A distinctive feature of the strip line block of this exemplary embodiment is that at least one of the strip lines, the one shown by a reference numeral 4, for instance, is provided with a portion where the pair of lines are not parallel to each other, as shown in FIG. 7. In other words, this strip line block 1 differs from that of the prior art, in that it is provided with the portion where the two lines constituting the strip line 4 are not parallel to each other as shown in FIG. 7. This structure can provide for an isolator of a very low loss, yet it has a passing characteristic in a wide band. FIG. 7 shows that the two lines constituting the strip line 4 are not parallel to each other. At least one of the plural of lines constituting the strip line 4 may have a portion not parallel to other lines.

In addition, it is desirable to form the strip line 4 in such a shape that a space between two lines is widened to make them not in parallel (generally diamond-shaped or rhomboidal shaped), as shown in FIG. 7.

The space in the strip line 4 can be widened by providing bent portions Z1 (bent portion in a shape of circular arc or bent portion having an angled corner) in a manner that the two lines constituting the strip line 4 expand outwardly. The strip line 4 may be made by die cutting a metal sheet with a punch or by a process of etching.

As described, the strip line 4 having the lines formed to be not in parallel and to be expanded outwardly and widened can achieve a low loss and a wide passing band that are most desirable.

In FIG. 7, an intersecting angle between the strip line 4 and the strip line 3 is made to be 110 degrees. Similarly, an intersecting angle between the strip line 4 and the strip line 2 is also made to be 110 degrees. Although it is most desirable in respect of the characteristics that an intersecting angle of approx. 110 degrees is maintained for all of intersecting points C1 through C8 between the strip line 4 and the other strip lines, there is a range of certain extent that is tolerable even if the intersecting angles disperse slightly.

It is desirable in respect of the characteristics that a difference between a largest angle and a smallest angle among the intersecting points C1 through C8 is 30 degrees or smaller, but preferably within 10 degrees, and more preferably within 5 degrees.

Third Exemplary Embodiment

Figure 8:
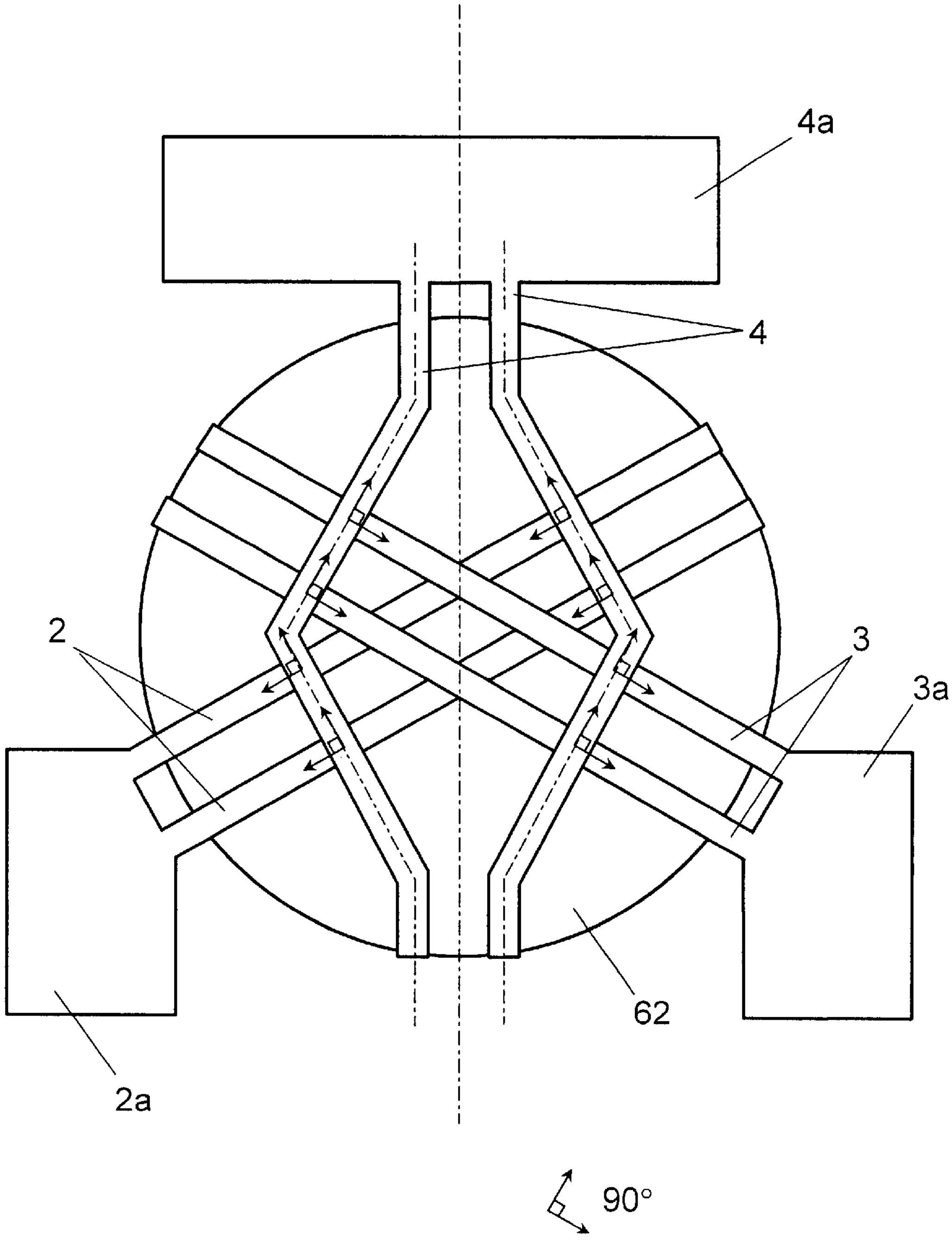
FIG. 8 is a plan view of a strip line block of an isolator of a third exemplary embodiment of the present invention.
Figure 9:
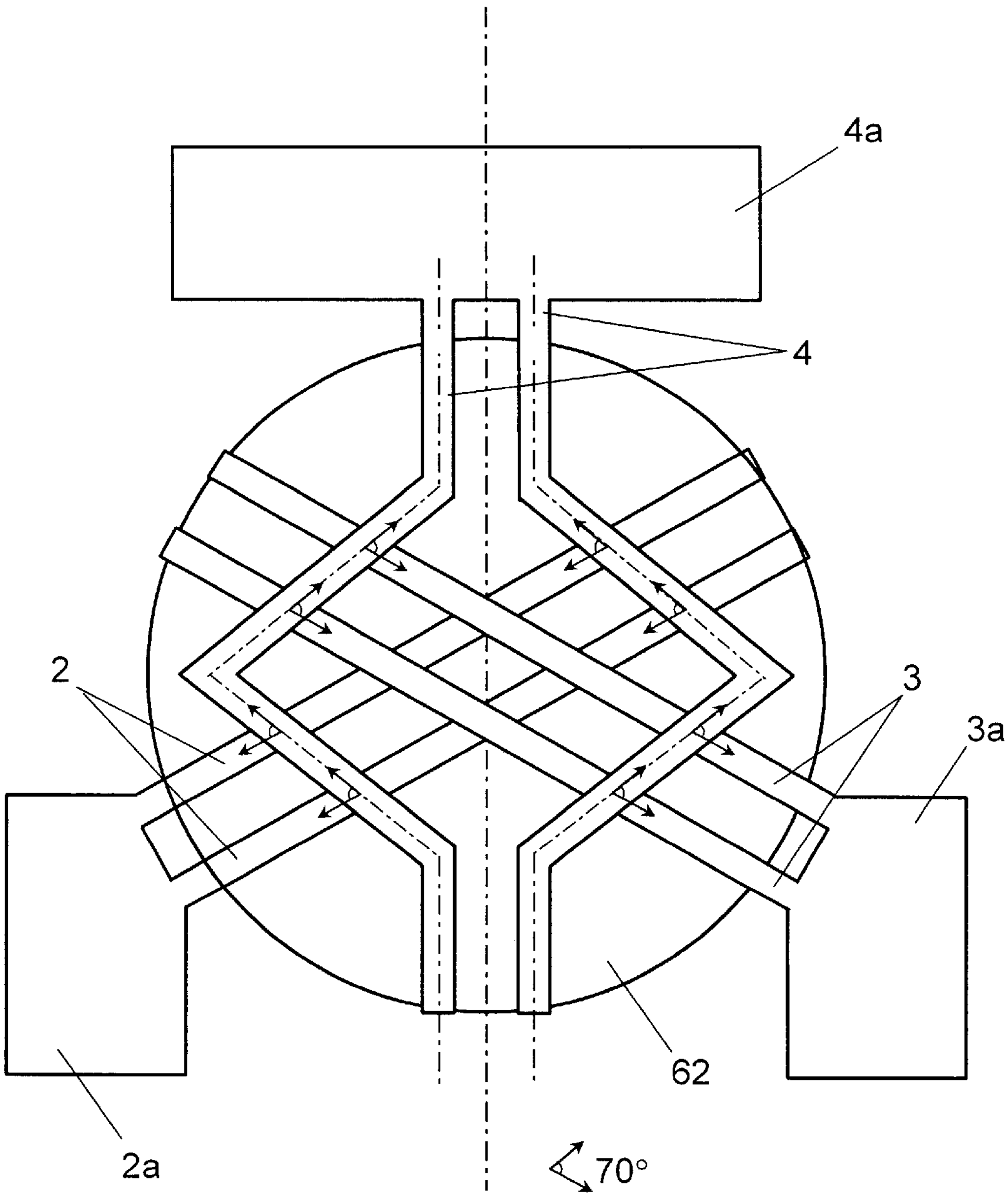
FIG. 9 is a plan view of a strip line block of an isolator of a fourth exemplary embodiment of the present invention.

A strip line block for the isolator of a third exemplary embodiment of the present invention will be described now by referring to FIG. 8.

The strip line block of this exemplary embodiment is nearly identical to that of the second exemplary embodiment shown in FIG. 7 in respect that the strip line 4 of generally diamond-shape or rhomboidal shape intersects with the other strip lines 2 and 3, except that the strip line 4 of this exemplary embodiment intersects with the other strip lines at an angle of 90 degrees.

The present invention can provide an isolator having the most advantageous passing characteristic of a wide band by setting the intersecting angle with the other strip lines to be approximately 90 degrees as disclosed in this exemplary embodiment. It is generally desirable that the intersecting angle is set at 90±10 degrees.

Fourth Exemplary Embodiment

A strip line block for the isolator of a fourth exemplary embodiment of the present invention will be described next.

The strip line block of this exemplary embodiment is nearly identical to that of the second exemplary embodiment shown in FIG. 7 in respect that the strip line 4 of generally diamond-shape or rhomboidal shape intersects with the other strip lines 2 and 3, except that the strip line 4 of this exemplary embodiment intersects with the other strip lines at an angle of 70 degrees.

Fifth Exemplary Embodiment

A strip line block for the isolator of a fifth exemplary embodiment of the present invention will be described next by referring to FIG. 10.

The strip line block of this exemplary embodiment differs from that of the second exemplary embodiment shown in FIG. 7 in respect that the strip line 4, intersecting with the other strip lines 2 and 3, is formed into a shape of circular arc such as a circle, an ellipse, an oval, an elongated circle, and the like.

In this instance, intersecting angles formed between any one of the lines constituting the strip line 4 and each of two lines constituting any of the strip lines 2 and 3 are different, as they are preferably 85 degrees and 105 degrees but not limited to these angles.

Sixth Exemplary Embodiment

Figure 11:
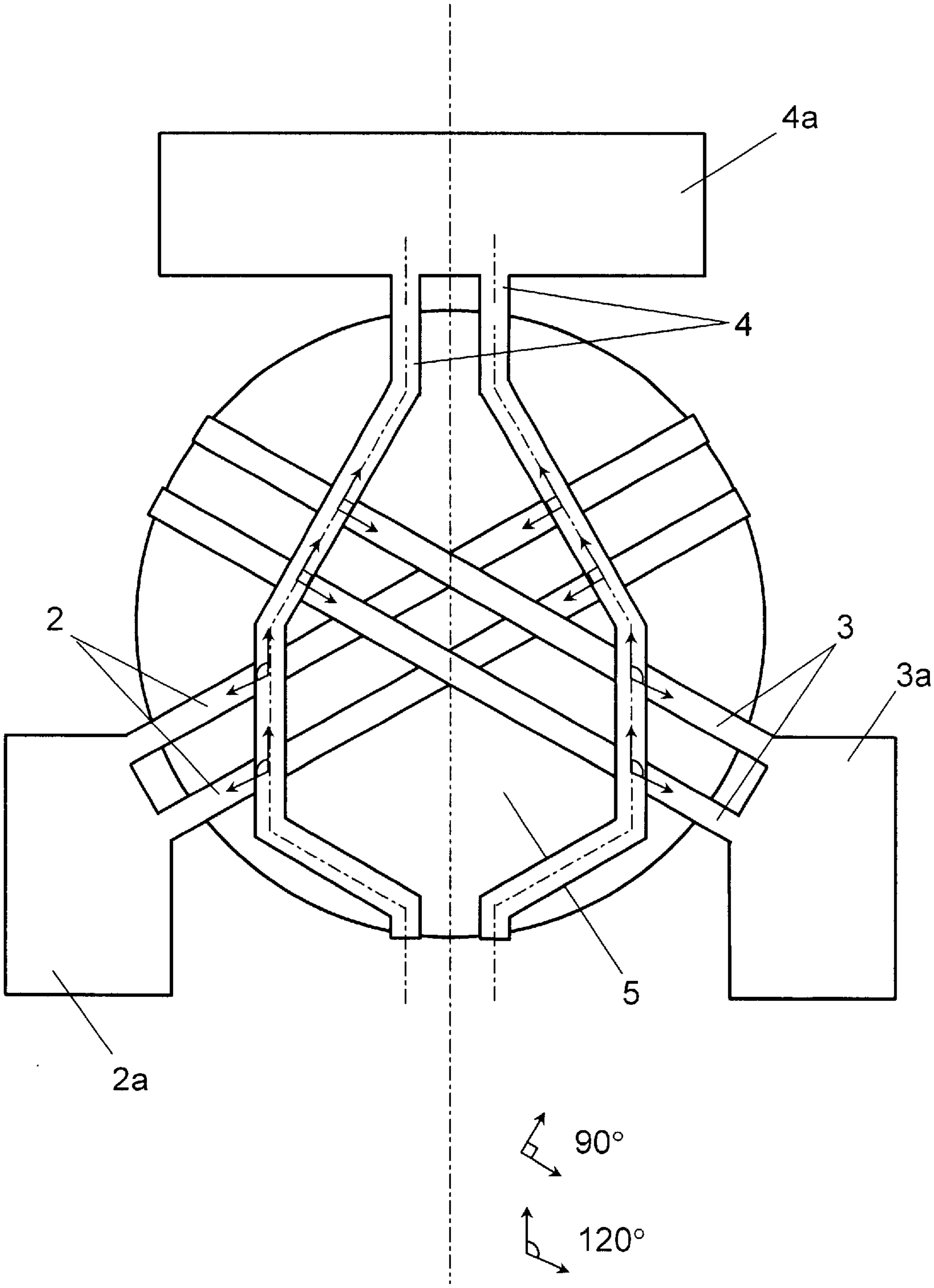
FIG. 11 is a plan view of a strip line block of an isolator of a sixth exemplary embodiment of the present invention.

A strip line block for the isolator of a seventh exemplary embodiment of the present invention will be described next by referring to FIG. 11.

The strip line block of this exemplary embodiment differs from that of the second exemplary embodiment shown in FIG. 7 in respect that the strip line 4, intersecting with the other strip lines 2 and 3, is formed into a polygonal shape.

Figure 10:
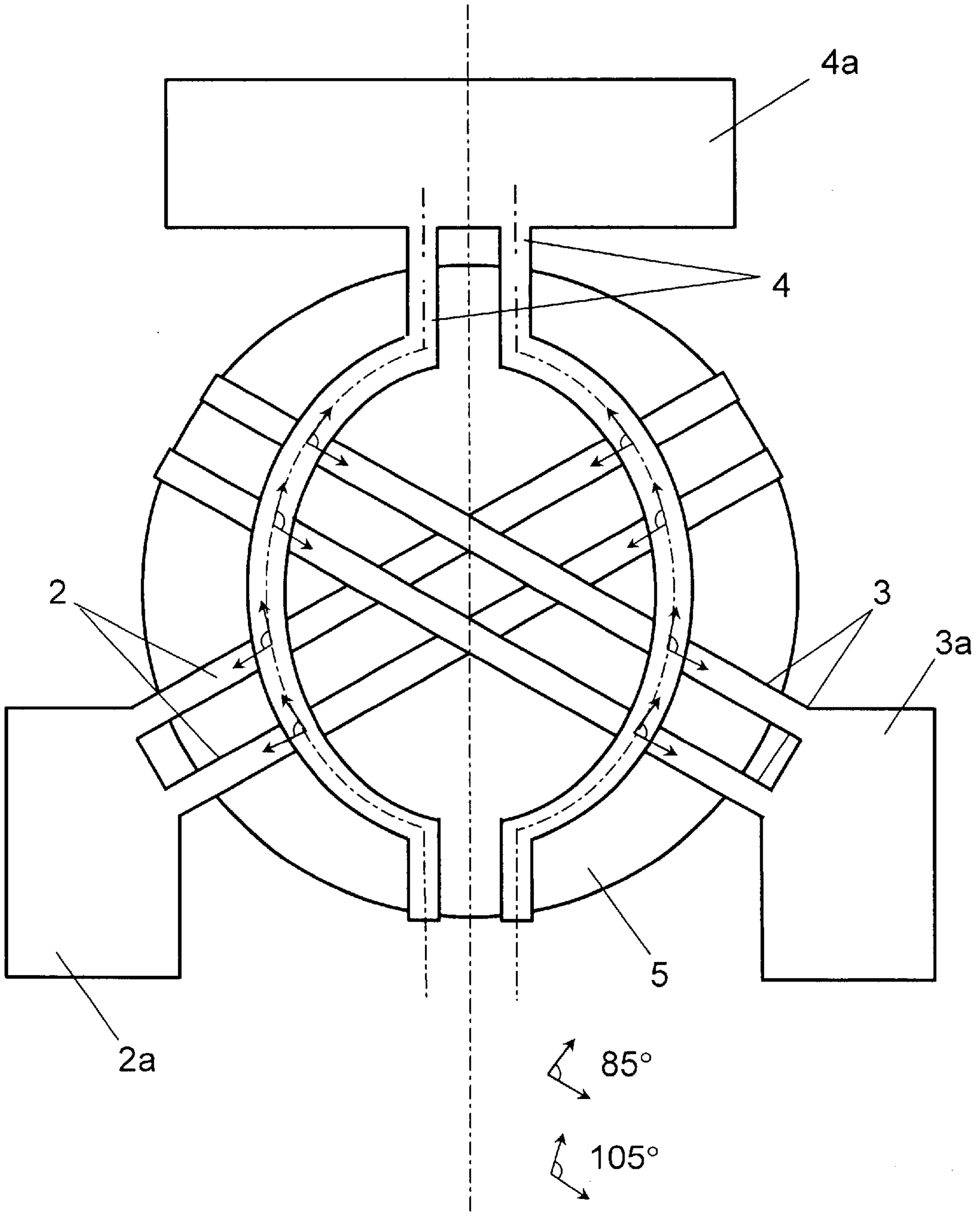
FIG. 10 is a plan view of a strip line block of an isolator of a fifth exemplary embodiment of the present invention.

In addition, the strip line block of this exemplary embodiment differs from that of the fifth exemplary embodiment shown in FIG. 10, in that both of two intersecting angles formed by one of the lines constituting the strip line 4 with two lines constituting the strip line 2 are 90 degrees, and both of other two intersecting angles formed with two lines constituting the strip line 3 are 120 degrees in this exemplary embodiment, whereas the two intersecting angles formed by one of the lines constituting the strip line 4 with two lines constituting any of the other strip lines 2 and 3 are different (85 degrees and 195 degrees) from each other in the fifth exemplary embodiment.

Figure 12:
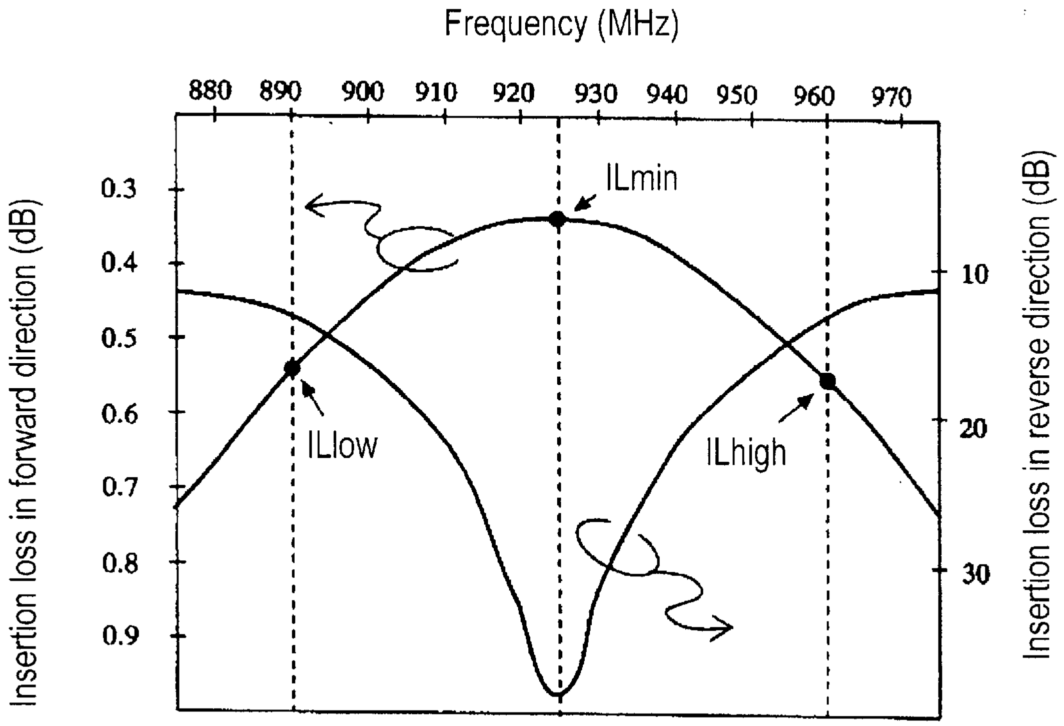
FIG. 12 is a graphical representation of a typical characteristic showing an insertion loss with respect to frequency of an isolator.

FIG. 12 is a graphical representation of typical electrical characteristics of an isolator. In evaluating an isolator of this exemplary embodiment, an insertion loss at a center frequency ("ILmin" in FIG. 12) and insertion losses at both ends of a frequency band ("ILlow" and "ILhigh" in FIG. 12) in a forward direction of the isolator are selected.

Table 1 shows a result of insertion loss characteristic in a forward direction of isolators equipped with the strip line structures of the second through sixth exemplary embodiments of the present invention and an isolator equipped with the strip line structure of the prior art technique for comparison purpose.

TABLE 1

| | Insertion loss in forward direction (dB) | | |
|---|---|---|---|
| | ILlow (890 MHz) | ILmin (925 MHz) | ILhigh (960 MHz) |
| Second exemplary embodiment | 0.53 | 0.35 | 0.53 |
| Third exemplary embodiment | 0.50 | 0.36 | 0.51 |
| Fourth exemplary embodiment | 0.56 | 0.40 | 0.55 |
| Fifth exemplary embodiment | 0.52 | 0.36 | 0.52 |
| Sixth exemplary embodiment | 0.55 | 0.38 | 0.56 |
| Prior art technique | 0.57 | 0.35 | 0.57 |

Every isolator showed insertion loss in a reverse direction of not less than 10 dB in the frequency band. It was found from Table 1, that use of the strip line structures of the above exemplary embodiments of this invention improves the insertion loss characteristic in the working frequency band as compared to the isolator of the prior art.

It was also found that the isolators of these exemplary embodiments have an advantageous effect to changes in temperature, since the insertion loss in vicinity of the center frequency is more close to flat than that of the prior art.

It is obvious from a comparison of the results between the sixth exemplary embodiment and the other exemplary embodiments that it is favorable to form all of the intersecting angles at not smaller than 70 degrees but not greater than 120 degrees.

Moreover, the insertion loss that can be compensated within the frequency band increases when the intersecting angles with the other strip lines are reduced below 90 degrees as in the case of the fourth exemplary embodiment, since this reduction deteriorates a minimum value of the insertion loss. This therefore convinces that the desirable intersecting angle with other strip lines shall not be smaller than 70 degrees and not greater than 120 degrees.

It is also known that the insertion loss that can be compensated within the frequency band becomes smallest when the intersecting angle is close to 90 degrees.

In the isolator of every exemplary embodiment of this invention, the strip lines have been shown to have such structure that intersecting angles among the strip lines to be connected to the input/output terminals are 120 degrees. However, this is not restrictive, and the present invention is equally effective even if the intersecting angles among the strip lines connected to the input/output terminals are either greater than or smaller than 120 degrees.

In the present invention, any of the above exemplary embodiments can provide for an isolator requiring no adjustment after completion of assembly, by constructing the capacitors 9, 10, and 11 in a manner that their composing material and preciseness of their shapes fall within a predetermined tolerance, and by restricting an amount of the bonding material applied between the constituent members within a predetermined limits.

Therefore, the present invention makes an inspection process unnecessary, and improves productivity of the isolators. The invention also requires no provision of holes in the upper enclosure 16 or the lower enclosure 7 for adjustment as in the case of the prior art isolator, so as to simplify structure of the components. This is particularly effective for isolators having outer dimensions smaller than 5 mm (length) by 5 mm (width) by 2.0 mm (height). A reason of this is that a small and thin isolator of the prior art has a small window for adjustment, which makes the adjustment very difficult. In other words, it is very difficult to trim electrodes of the capacitors 9, 10, and 11 in the miniaturized isolator.

The isolator of the present invention requires no trimming, and therefore the windows for adjustment in the upper enclosure 16 and the lower enclosure 7. The present invention can provide for the isolator requiring no adjustment after completion of assembly, as it allows use of capacitors 9, 10, and 11 without a cut by trimming.

A characteristic of the capacitors 9, 10, and 11 will be described now.

It is desirable to use a so-called paralleled flat capacitor, which comprises a dielectric substrate with an electrode formed on both sides, as the capacitor employed in the isolator of this invention.

Capacitance values required for the capacitors 9, 10, and 11 are between 1 pF and 22 pF, and their tolerances are desirably within ±1.6% (more desirably within ±0.8%).

In an instance where capacitances of the capacitors 9, 10, and 11 are assumed to be a same value of 10 pF, capacitors usable for the application have a range of tolerance in capacity between a minimum of 9.84 pF and a maximum of 10.16 pF. This will make the adjustment unnecessary after the isolator is assembled.

In other words, an ideal target value Cz for the capacitors 9, 10, and 11 having a maximum value C1 and a minimum value C2 of their capacitances is given by Cz=(C1+C2)/2, and it shall satisfy formulae, $$|C1-Cz|/Cz\times100<1.6,\text{ and }|C2-Cz|/Cz\times100<1.6,$$

(these are hereinafter referred to as "formulae by the ideal target value").

Furthermore, capacitance values of the capacitors 9 and 10 are set to be at nearly same value, with their tolerances of either within ±1.6% of the target value or a value obtained with the formulae by the ideal target value. In addition, it is preferable to use the capacitors 9, 10, and 11, whose capacitances satisfy a relation of 1 pF<C9, C10, and C11<22 pF, when capacitance of the capacitors 9 and 10 are denoted by C9 and C10 respectively, and a capacitance of the capacitor 11 collected in parallel with the resistor 17 is denoted by C11.

As a next step, the individual components composing the isolator of the present invention as well as their constituent elements are bonded. Basically, bonding material used here is characterized by not containing lead.

Moreover, the constituent components and material composing the isolator of the present invention are restricted to contain 0.005 gram or less (preferably 0.001 gram or less) of lead component. This makes the isolator of the present invention very friendly to the environment, since it discharges no, or minimal amount of hazardous lead when an electronic device equipped with the isolator is disposed.

The bonding material used for the isolators of this invention is so- called lead free solder composed of pure Sn (tin), or Sn containing at least one of Ag (silver), Cu (copper), Zn (zinc), Bi (bismuth), and In (indium). Use of this kind of bonding material can reduce lead content in the isolator to nearly zero.

Seventh Exemplary Embodiment

A structure and a method of assembling an isolator of a seventh exemplary embodiment of the present invention will be described hereinafter.

Figure 13:
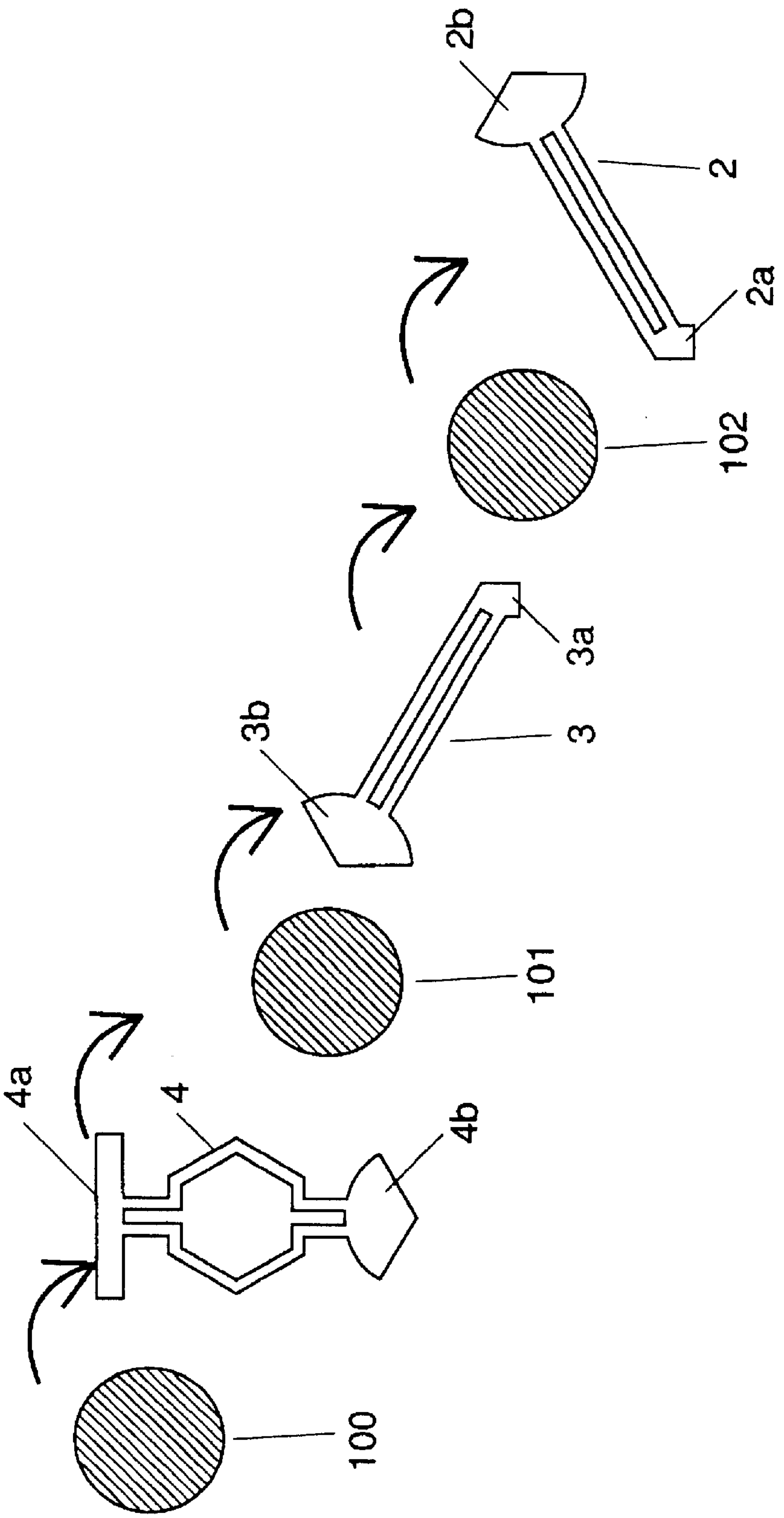
FIG. 13 is a drawing showing assembling steps of a strip line block of an isolator according to a seventh exemplary embodiment of the present invention.

As shown in FIG. 13, a strip line 4 having a ground tab 4*b* and a terminal 4*a*, is placed on a circular plate 100 made of polyimide for insulation, of which surface is coated with at least epoxy resin workable to thermo-compression bonding. The ground tab 4*b* is formed at one end of the strip line 4 in a shape of a section of three equally split circle. The terminal 4*a* is formed at the other end of the strip line 4.

Another circular plate 101 of polyimide for insulation, coated with epoxy resin workable to thermo-compression bonding is placed on the strip line 4, and a strip line 3 having a ground tab 3*b* and a terminal 3*a* is placed on the circular plate 101. The ground tab 3*b* is formed at one end of the strip line 3 in the shape of a section of three equally split circle. The terminal 3*a* is formed at the other end of the strip line 3. And furthermore, still another circular plate 102 of polyimide for insulation, coated with epoxy resin workable to thermo-compression bonding is placed on the strip line 3, and then a strip line 2 having a ground tab 2*b* and a terminal 2*a* is placed on the circular plate 102. The ground tab 2*b* is formed at one end of the strip line 2 in the shape of a section of three equally split circle. The terminal 2*a* is formed at the other end of the strip line 2.

Figure 14A:
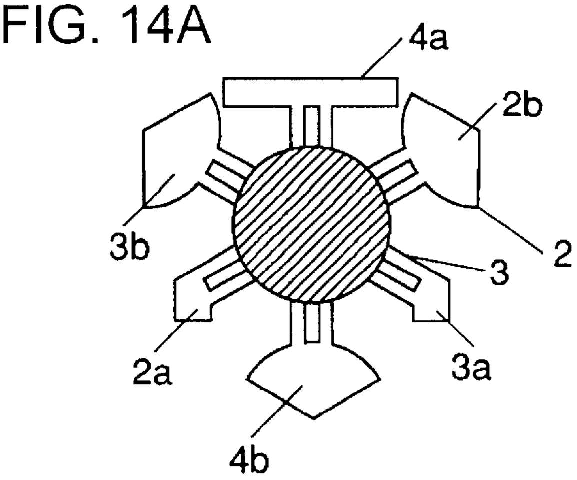
FIG. 14A to 14C are drawings showing assembling steps of the strip line block with a ferrite substrate of an isolator according to the seventh exemplary embodiment of the present invention.
Figure 14B:
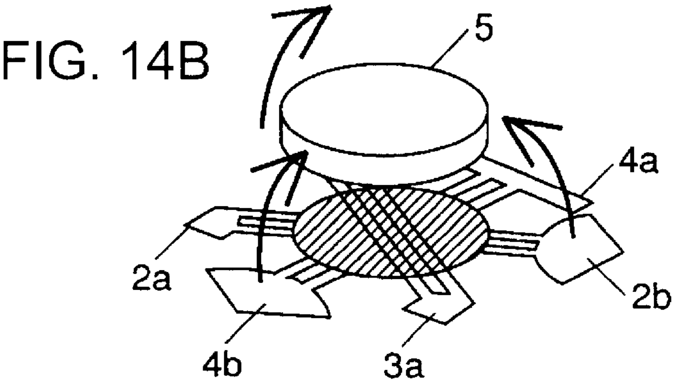

Next, the three polyimide circular plates and three strip lines piled up as described above are subjected to a process of thermo-compression bonding to produce an integrated strip line block 1, as shown in FIG. 14A. A ferrite substrate 5 is placed on the strip line block 1, as shown in FIG. 14B. The strip lines 2, 3, and 4 are bent along a side surface of the ferrite substrates, and the ground tabs 2*b*, 3*b*, and 4*b* are also bent in a manner that they stay attached to an upper surface of the ferrite substrate 5. The three ground tabs 2*b*, 3*b*, and 4*b* are placed in a manner that they divide equally the upper surface of the ferrite substrate 5 into three equal parts.

Figure 14C:
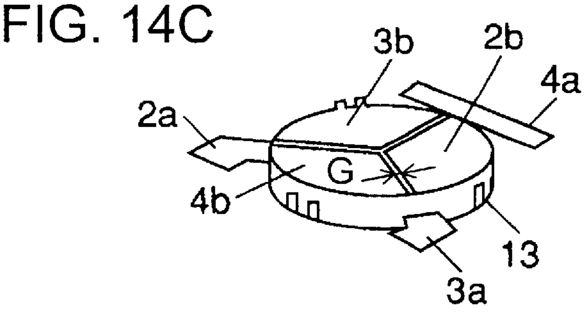

It is desirable in respect of the characteristics of the isolator, etc. that the three ground tabs 2*b*, 3*b*, and 4*b* placed in a manner to generally equally split the upper surface of the ferrite substrate 5 are so arranged in this process that they do not overlap with each other even though they can touch electrically on the upper surface of the ferrite substrate 5. It is desirable to provide a gap G of 50 to 500 $\mu$m between any two of the ground tabs 2*b*, 3*b*, and 4*b*, as shown in FIG. 14C.

The ferrite substrate 5 is placed on a lower enclosure 7 in a manner hat the surface having the ground tabs 2*b*, 3*b*, and 4*b* face the lower enclosure 7, and the ground tabs 2*b*, 3*b*, and 4*b* are connected to the lower enclosure 7 both electrically and mechanically by soldering or the like means.

Capacitors 9, 10, and 11 are connected in parallel to the terminal 2*a*, 3*a* and 4*a* of their respective strip lines 2, 3, and 4.

In the past, three sets of the strip lines, extending in a shape of generally a letter Y from a circular ground plate connected to the lower enclosure 7, have been bent on the ferrite substrate 5, and bent again horizontally along the upper surface of the ferrite substrate 5. It has therefore been very difficult to make the three sets of strip lines cross with each other accurately at a desired intersecting angle on the upper surface of the ferrite substrate 5, when bending them. Hence, it has been difficult to stably supply products of superior characteristics, since the characteristics disperse due to variation of the intersecting angles among the strip lines.

In the isolator of this exemplary embodiment, the three strip lines 2, 3, and 4 are assembled in advance in a manner to cross with each other at the desired intersecting angle, with the polyimide circular plates 100, 101 and 102, coated with epoxy resin workable to thermo-compression bonding inserted alternately among them. They are then integrated by the thermo-compression bonding to complete the strip line block 1. Accordingly, the three sets of strip lines can be arranged easily to cross with each other accurately at the desired intersecting angle.

In the isolator of this exemplary embodiment, although the polyimide circular plates 100, 101 and 102 are specified as the material for insulating the individual strip lines 2, 3, and 4, other insulating materials can be used. Any insulating material such as sheet or plate form plastic resin, ceramic, and the like having a suitable insulating property may be used, other than polyimide.

In the isolator of this exemplary embodiment, although the polyimide circular plates 100, 101 and 102 serving as the insulating material are coated with the epoxy resin workable to thermo-compression bonding on only one of their surfaces, it can be coated on both surfaces. Instead of the epoxy resin workable to thermo-compression bonding, other material having adhesiveness capable of being hardened at a normal ambient temperature may be provided on at least one of the surfaces. Or, a tape, or the like that is double-coated with adhesive material may be used as an alternative to the insulating material.

Moreover, although the isolator of the present exemplary embodiment is an example provided with the three polyimide circular plates 100, 101 and 102 for the insulating material, at least the polyimide circular plates 101 and 102 are only necessary, whereas the polyimide circular plate 100 may be omitted as needed.

Although the polyimide circular plates 100, 101 and 102 used in the isolator of this exemplary embodiment are shown as having generally the same shape and the same area, they may be a polygonal shape, an elliptical shape, a star shape, and the like. The area can also be chosen according to the necessity.

Although the strip lines 2, 3, and 4 are made individually as separate elements, these separate elements may be individually formed on three sheets arranged two-dimensionally, so as to complete the isolator as an integrated block by combining the three sheets by thermo-compression bonding or adhesion, in order to improve productivity.

In addition, the ferrite substrate 5 may be formed into a polygonal shape in order to improve workability and accuracy in processing during a process of placement and bending the strip line block 1 on the ferrite substrate 5.

In the isolator of this exemplary embodiment, although the ground tabs 2*b*, 3*b* and 4*b* are directly bonded both electrically and mechanically to the lower enclosure 7, a separate ground frame may be arranged between the lower enclosure 7 and the ground tabs 2*b*, 3*b* and 4*b*, thereby making connections of the ground tabs 2*b*, 3*b* and 4*b* to this ground frame, mechanically and electrically.

A feature of the isolator of this exemplary embodiment is that it provides for the strip line block 1, wherein desired intersecting angles can be constructed with high accuracy, as shown in FIG. 13 through FIG. 14C. Am accuracy of the intersecting angles among the strip lines 2, 3 and 4 closely relates to the electrical characteristics and dispersion of a product carrying the isolator, whereas three generally equally split positions of the ground tabs 2*b*, 3*b* and 4*b*, or gaps provided between the ground tabs 2*b*, 3*b* and 4*b*, are not required to be as accurate as the intersecting angles of the strip lines 2, 3 and 4. It is generally desirable to restrict accuracy of the intersecting angles of the strip lines 2, 3 and 4 within ±3 degrees, and more desirably within ±1 degree. It is also important that a center of tolerance corresponds to a center of the ferrite substrate 5. The present exemplary embodiment is capable of satisfying these requirements, and providing readily an isolator having superior performance and a small dispersion. The structure as described above can realize the isolator of a very small size, yet having a passing characteristic of low loss.

Eighth Exemplary Embodiment

An isolator of an eighth exemplary embodiment of the present invention will be described next.

Figure 15:
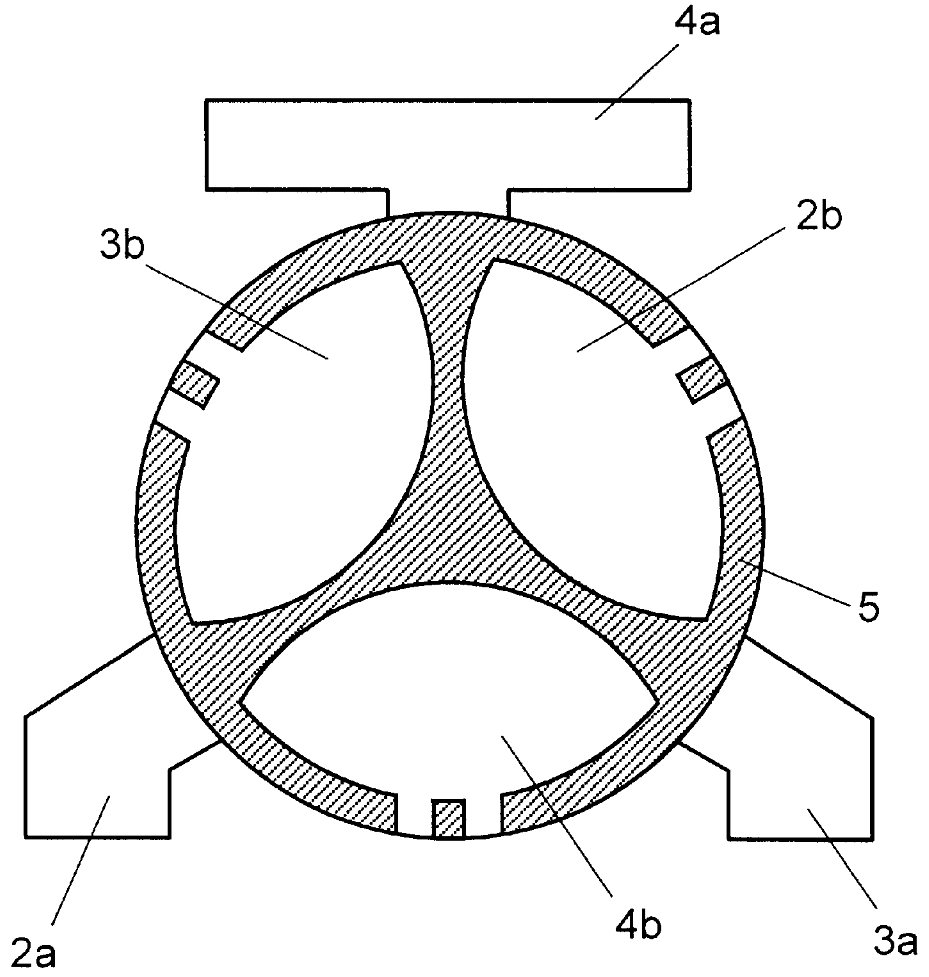
FIG. 15 is a plan view depicting a shape of a ground tab of a strip line block of an isolator of an eighth exemplary embodiment of the present invention.

FIG. 15 shows a shape of ground tabs of a strip line block of the isolator of the eighth exemplary embodiment of this invention. The strip line block of this isolator differs from that shown in FIG. 14 in respect of the shape of the ground tabs 2*b*, 3*b* and 4*b*.

In FIG. 14, the ground tabs 2*b*, 3*b*, and 4*b* are divided into shapes of three generally equally split circle. The ground tabs 2*b*, 3*b* and 4*b* are constructed with a gap of 50 to 500 $\mu$m between them, after the strip lines are bent in a manner to attach tightly to the ferrite substrate 5. Therefore, each of the ground tabs has a generally sectoral shape.

On the other hand, as shown in FIG. 15, the ground tabs 2*b*, 3*b* and 4*b* have a shape of circular arc combination in this exemplary embodiment. Adoption of such a shape can substantially reduce a chance of the ground tabs 2*b*, 3*b* and 4*b* to overlap with each other on a surface of the ferrite substrate 5, during a process of bending the strip lines 2, 3 and 4.

Ninth Exemplary Embodiment

An isolator of a ninth exemplary embodiment of the present invention will be described next.

Figure 16:
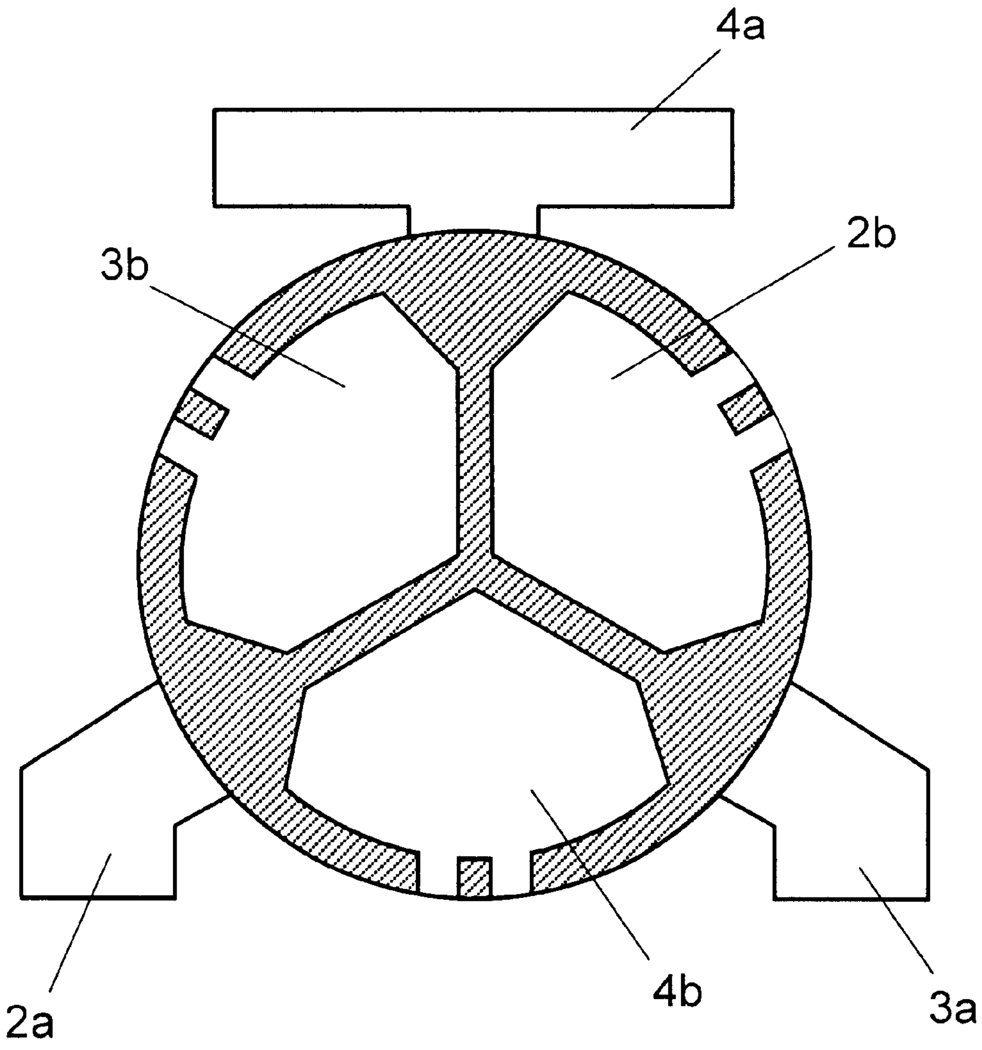
FIG. 16 is a plan view depicting a shape of a ground tab of a strip line block of an isolator of a ninth exemplary embodiment of the present invention.

A strip line block of the isolator of the ninth exemplary embodiment of the present invention shown in FIG. 16 differs from that shown in FIG. 14 in respect that ground tabs of strip lines are formed into a polygonal shape. This exemplary embodiment can also reduce a chance of the ground tabs 2*b*, 3*b* and 4*b* to overlap with each other on a surface of the ferrite substrate 5.

Tenth Exemplary Embodiment

An isolator of a tenth exemplary embodiment of the present invention will be described now.

Figure 17:
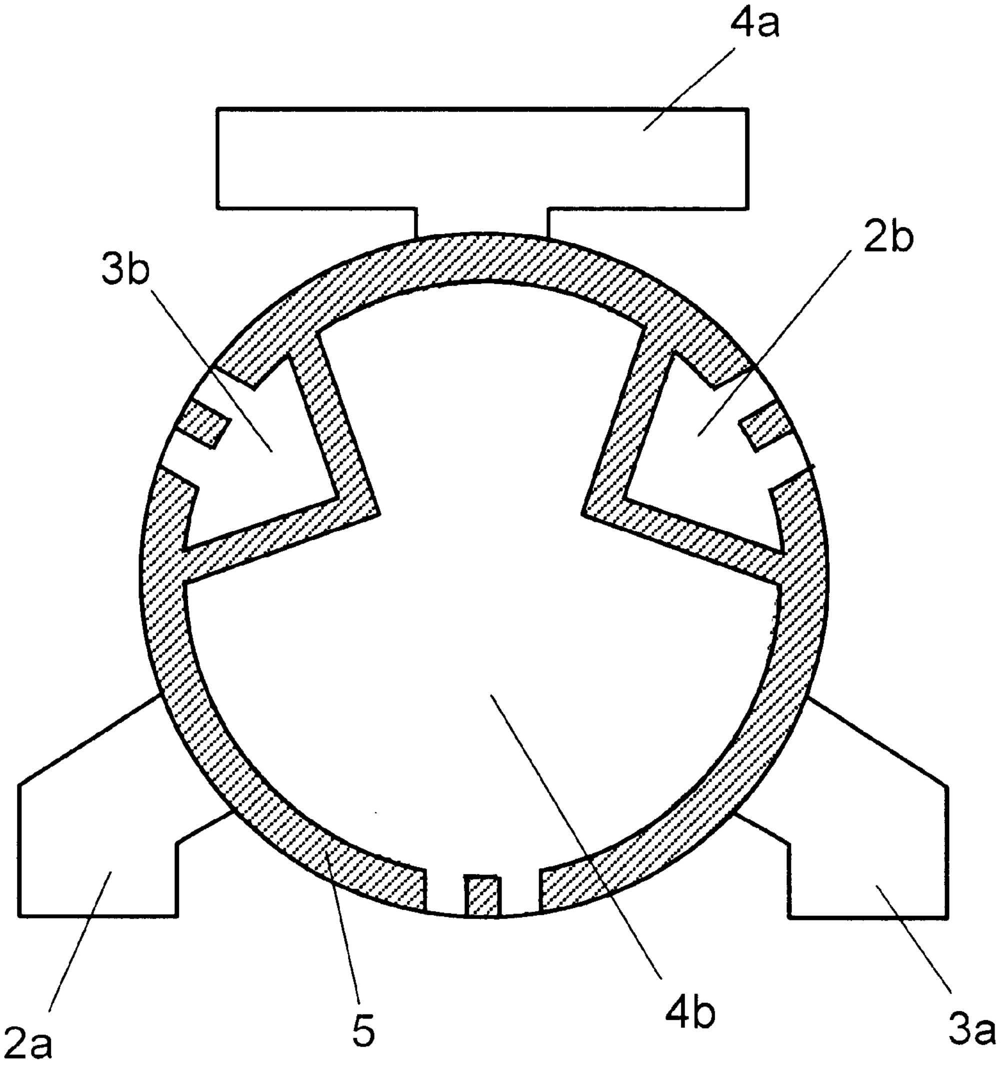
FIG. 17 is a plan view depicting a shape of a ground tab of a strip line block of an isolator of a tenth exemplary embodiment of the present invention.

A strip line block of the isolator of the tenth exemplary embodiment of the present invention shown in FIG. 17 differs from those of the other exemplary embodiments in respect that at least any one of ground tabs 2*b*, 3*b* and 4*b* of strip lines has a surface area greater than areas of the other ground tabs, instead of making the ground tabs 2*b*, 3*b* and 4*b* of the strip lines to have nearly equal area, as in the case of the other exemplary embodiments. Adoption of these surfaces can prevent a loss of productivity and degradation of processing accuracy due to partial overlapping of the three strip lines, when the strip line block is assembled.

Eleventh Exemplary Embodiment

An isolator of an eleventh exemplary embodiment of the present invention will be described next.

Figure 18:
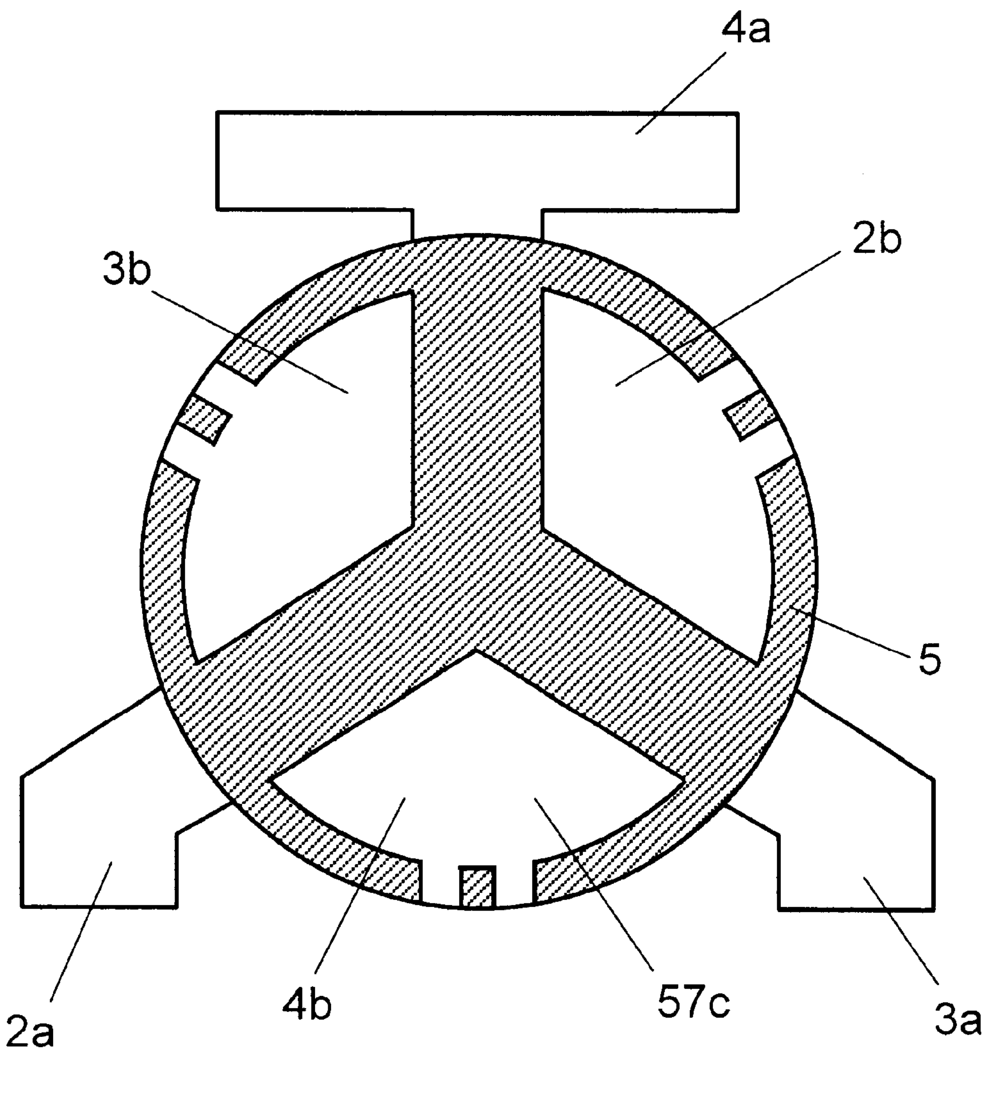
FIG. 18 is a plan view depicting a shape of a ground tab of a strip line block of an isolator of an eleventh exemplary embodiment of the present invention.

FIG. 18 shows a strip line block of the isolator of the eleventh exemplary embodiment of this invention. The present exemplary embodiment differs from the other exemplary embodiments in respect that a total area of ground tabs 2*b*, 3*b* and 4*b* of strip lines is not nearly equal to a bottom surface area of a ferrite substrate 5, but it is approximately 40%, and more preferably 80% or less, of the bottom surface area of the ferrite substrate 5.

This structure allows a sufficient gap between the ground tabs 2*b*, 3*b* and 4*b*. It also facilitates a process of integrally bonding, the ground tabs 2*b*, 3*b* and 4*b* both electrically and mechanically to a ground frame or to a lower enclosure 7 by soldering, etc. Moreover, it minimizes a clearance between the ferrite substrate 5 and the ground frame or the lower enclosure 7, thereby helping to stabilize characteristics and to reduce dispersion.

Although the present exemplary embodiment as described here is an example wherein the ground tabs 2*b*, 3*b* and 4*b* are formed into sectoral shape, they can be of any other shape such as those shown in FIGS. 15, 16, and 17. Moreover, the individual ground tabs may have different surface areas as shown in FIG. 17.

Table 2 shows characteristics of the isolator of this exemplary embodiment of the invention and an isolator of the prior art for comparison purpose. In this instance, the electrical characteristics such as insertion losses, isolations, and frequency bandwidths in a passing band are equivalent for both of the present invention and prior art. However, the isolators of the present invention exhibit a far smaller dispersion among products and superior mean value of the characteristics as compared to the isolators of the prior art, as shown in Table 3, if a large quantity of the products are manufactured.

TABLE 2

| | Insertion loss (dB) | Isolation (dB) | Bandwidth (dB) |
|---|---|---|---|
| First exemplary embodiment | <0.55 | >17 | 61.0 MHz |
| Prior art technique | <0.56 | >17 | 61.2 MHz |

Passing band frequency: 824–849 MHz

TABLE 3

| | Insertion loss (dB) | Isolation (dB) | Bandwidth (dB) |
|---|---|---|---|
| First exemplary embodiment | 0.54–0.59 | 15.4–17.1 | 57–61 MHz |
| Prior art technique | 0.55–0.64 | 14.2–17.2 | 54–62 MHz |

Passing band frequency: 824–849 MHz

Twelfth Exemplary Embodiment

A mobile communication apparatus using the isolator of an exemplary embodiment of the present invention will be described hereinafter.

Figure 19:
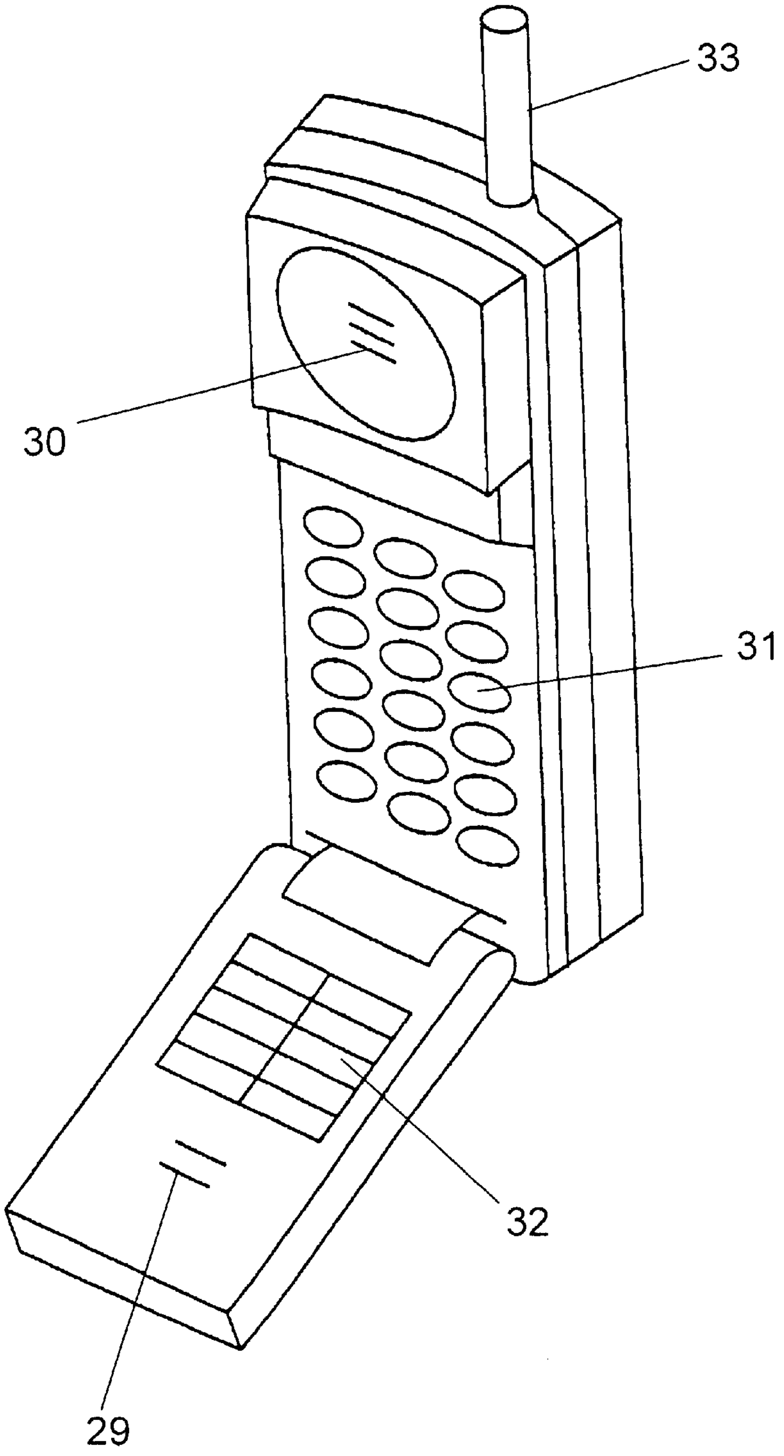
FIG. 19 is a perspective view of a mobile communication apparatus of a twelfth exemplary embodiment of the present invention.
Figure 20:
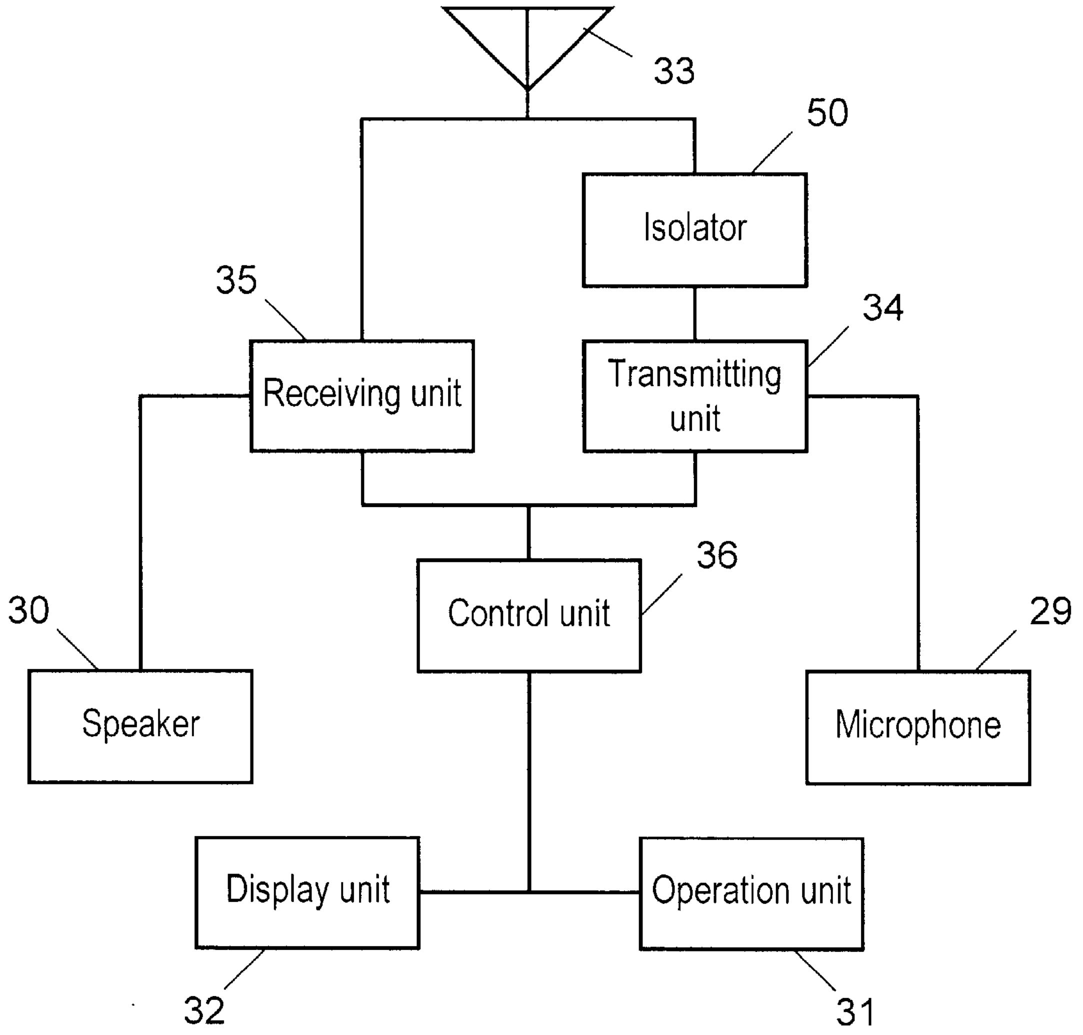
FIG. 20 is a block diagram showing a circuit structure of the mobile communication apparatus of the twelfth exemplary embodiment of the present invention.

FIG. 19 and FIG. 20 are a perspective view and a block diagram respectively, showing a mobile communication apparatus of a twelfth exemplary embodiment of the present invention.

As shown in FIG. 19 and FIG. 20, the mobile communication apparatus includes: a microphone 29 for converting voice into an aural signal; a speaker 30 for converting an aural signal into voice; an operating unit 31 having a dial button and the like; a display unit 32 for displaying an incoming call, etc.; an antenna 33; and a transmitting unit 34 for modulating the aural signal of the microphone 29 and converting it into a transmission signal.

The transmission signal produced by the transmitting unit 34 is emitted to outside via the antenna 33. A receiving unit 35 converts a reception signal received by the antenna 33 into an aural signal, and the aural signal is converted into voice with the speaker 30.

The control unit 36 controls the transmitting unit 34, the receiving unit 35, the operating unit 31, and the display unit 32.

The device operates in a manner as described hereinafter.

First, when an incoming call arrives, the receiving unit 35 sends an incoming call signal to the control unit 36, and the control unit 36 causes the display unit 32 to display the information based on the incoming call signal. When a button or the like on the operating unit 31 is depressed indicating an intent of receiving the call, the signal is forwarded to the control unit 36, and the control unit 36 sets related units in a reception mode.

That is, a signal received with the antenna 33 is converted into an aural signal by the receiving unit 35, and the aural signal is output from the speaker 30 as a voice. Also, a voice input from the microphone 29 is converted into an aural signal, and it is sent outside from the antenna 33 through the transmitting unit 34.

When transmitting a signal, the control unit 31 inputs a signal implying a transmission to the control unit 36. Subsequently, when the control unit 31 sends another signal corresponding to a telephone number to the control unit 36, the control unit 36 transmits the signal corresponding to the telephone number from the antenna 33, through the transmitting unit 34 and an isolator 50.

When a communication with another party is established by the transmitted signal, a signal indicating it is sent back to the control unit 36 via the antenna 33 and the receiving unit 35, and the control unit 36 sets related units in a transmission mode.

In other words, the signal received with the antenna 33 is converted into an aural signal by the receiving unit 35, and the aural signal is output from the speaker 30 as a voice. At the same time, a voice input from the microphone 29 is converted into another aural signal, and it passes the transmitting unit 34 and the isolator 50, and transmitted to outside from the antenna 33.

Although the present exemplary embodiment is an example, wherein the device transmits and receives voice, it is not restrictive to the voice. A similar process is made with a device that carries out at least one of transmission and reception of a data signal, other than voice, such as a text data.

In the mobile communication apparatus as constructed above, the isolator 50 of the present invention is provided between a power amplifier contained in the transmitting unit 34 and the antenna 33, as shown in FIG. 20. However, the isolator 50 may be equipped in the transmitting unit 34 in some cases.

Since the mobile communication apparatus of this exemplary embodiment as constructed above is of a low loss, the mobile communication apparatus can achieve saving of power, and realizes a long time usage of the device, if it uses a battery, etc. for a power supply. Moreover, this mobile communication apparatus can transmits a signal of a wide frequency band, since its passing characteristics improves in the wide frequency band, thereby improving an accuracy of communication and performance of data transmission.

As has been described, the isolator of the present invention is constructed in a manner that: three sets of strip lines are integrally composed highly accurately in advance with a desired intersecting angle between them by thermo-compression bonding or adhesive insulating material; the integrally composed three strip lines are attached to a ferrite substrate by bending them at corners of the ferrite substrate; ground tabs of the three strip lines are disposed on the ferrite substrate; and the ground tabs are connected electrically and mechanically to a lower enclosure by soldering and the like. This structure provides for the superior isolator having a small dispersion in electrical characteristics and manufacturing quality.

| Reference Numerals | |
|---|---|
| 1 | Strip line block |
| 2, 3, 4 | Strip line |
| 2a, 3a, 4a | Terminal |
| 2b, 3b, 4b | Ground tab |
| 5 | Ferrite substrate |
| 6 | Magnet |
| 7 | Lower enclosure |
| 7a | Pit or through hole |
| 8 | Insulator |
| 9, 10, 11 | Capacitor |
| 12 | Terminal base |
| 12a | Protrusion |
| 13, 14 | Terminal |
| 15 | Through hole |
| 15a | Bump |
| 16 | Upper enclosure |
| 17 | Resistor |
| 29 | Microphone |
| 30 | Speaker |
| 31 | Operating unit |
| 32 | Display unit |
| 33 | Antenna |
| 34 | Transmitting unit |
| 35 | Receiving unit |
| 36 | Control unit |
| 50 | Isolator |
| 100, 101, 102 | Polyimide circular plate |
| C1–C8 | Intersecting point between strip line 4 and other strip lines |
| IL min | Insertion loss in a forward direction at a center frequency |
| IL low, IL high | Insertion loss at both ends of frequency band |

What is claimed is:

1. A non-reciprocal circuit device comprising:

a substrate having magnetism;

a magnet provided facing said substrate;

a strip line block comprising a plurality of strip lines, and provided adjacent to said substrate, said plurality of strip lines electrically insulated from one another, and multi-layered together;

a capacitor connected to said strip line block; and an enclosure for housing at least said substrate, said magnet, and said strip line block, wherein said non-reciprocal circuit device has a length, a width, and a thickness which are denoted respectively by L1, L2, and L3, wherein $$2.5\ \text{mm} < L1 < 7.0\ \text{mm},$$

$$2.5\ \text{mm} < L2 < 7.0\ \text{mm, and}$$

$$1.0\ \text{mm} < L3 < 3.5\ \text{mm},$$

said substrate defining an area denoted by S1, such that $$S1/(L1 \times L2) = 0.1\text{–}0.78,$$

said magnet having a thickness of L4, such that $$L4/L3 = 0.2\text{–}0.5, \text{ and}$$

said magnet defining an area denoted by S2, such that $$S1/S2 = 0.15\text{–}0.83.$$

2. The non-reciprocal circuit device according to claim 1, wherein said substrate has a shape of a circular plate having a diameter of 1.6 mm or greater, and said diameter is smaller than a smaller one of said L1 and said L2.

3. The non-reciprocal circuit device according to claim 1, wherein said substrate has a shape of a square plate having a longitudinal side length of 1.6 mm or greater, and said longitudinal side length is smaller than a smaller one of said L1 and said L2.

4. The non-reciprocal circuit device according to claim 1, further comprising a terminal base within said enclosure, said terminal base having an encasement structure for surrounding at least one of said substrate and said magnet, wherein a portion of said terminal base and said strip line block are connected electrically.

5. The non-reciprocal circuit device according to claim 4, wherein said terminal base comprises an insulating base and an electrically conductive terminal disposed on said base.

6. The non-reciprocal circuit device according to claim 5, wherein said terminal base has a heat resistance to 250° C. or greater.

7. The non-reciprocal circuit device according to claim 5, wherein said electrically conductive terminal is mounted on said insulating base by insert molding.

8. The non-reciprocal circuit device according to claim 1, wherein a bonding material for bonding constituent components of said non-reciprocal circuit device and said constituent components comprises material substantially free from lead.

9. The non-reciprocal circuit device according to claim 8, wherein said bonding material comprises one of only Sn or a material containing Sn and at least one of Ag, Cu, Zn, Bi, and In.

10. The non-reciprocal circuit device according to claim 1, wherein said enclosure and a constituent component housed in said enclosure contain lead of 0.005 gram or less.

11. The non-reciprocal circuit device according to claim 1, wherein said enclosure is free from adjustment window for adjusting a constituent component housed therein.

12. The non-reciprocal circuit device according to claim 11, wherein said capacitor is free from a trace by trimming.

13. The non-reciprocal circuit device according to claim 11, wherein said capacitor has dispersion in capacitance of within ±1.6% of a target value.

14. The non-reciprocal circuit device according to claim 1, wherein at least a first strip line among said plurality of strip lines comprises a plurality of lines, and at least one of said plurality of lines has a portion not parallel to other lines.

15. The non-reciprocal circuit device according to claim 14, wherein each of strip lines other than said first strip line comprises a plurality of lines that are parallel to one another.

16. The non-reciprocal circuit device according to claim 14, wherein said plurality of lines constituting said first strip line are symmetrically formed.

17. The non-reciprocal circuit device according to claim 16, wherein said plurality of lines constituting said first strip line are expanded outwardly.

18. The non-reciprocal circuit device according to claim 14, wherein said portion not parallel to other lines of said plurality of lines constituting said first strip line has an outward shape of at least one of a diamond, a rhomboid, a circular arc, and a polygon.

19. The non-reciprocal circuit device according to claim 14, wherein each of said plurality of lines constituting said first strip line forms an intersecting angle of 70 degrees to 120 degrees with other strip lines.

20. The non-reciprocal circuit device according to claim 19, wherein each of said plurality of lines constituting said first strip line forms intersecting angles of substantially same degree with other strip lines.

21. The non-reciprocal circuit device according to claim 20, wherein a difference between a largest and a smallest of said intersecting angles is not greater than 30 degrees.

22. The non-reciprocal circuit device according to claim 20, wherein a difference between a largest and a smallest of said intersecting angles is not greater than 5 degrees.

23. The non-reciprocal circuit device according to claim 1, wherein said plurality of strip lines are multi-layered with an insulator inserted thereamong on one of surfaces of said substrate, and mounted on another surface of said substrate in a manner not to overlap with each other.

24. The non-reciprocal circuit device according to claim 23, wherein:

said plurality of strip lines are individually prepared separately;

each of said strip lines comprises a terminal, a ground tab, and a line portion connecting between said terminal and said ground tab;

said line portion of each of said strip lines is insulated from each other and multi-layered on said one of surfaces of said substrate; and said ground tab is mounted on said another surface of said substrate in a manner not to overlap with each other.

25. The non-reciprocal circuit device according to claim 1, wherein said strip line is bent on a side surface of said substrate, and bent again at another side surface opposite of said side surface along said opposite side surface.

26. The non-reciprocal circuit device according to claim 1, wherein said magnet bears a magnetic flux density of 30 mT to 80 mT.

27. The non-reciprocal circuit device according to claim 1, said non-reciprocal circuit device included in a mobile communication apparatus comprising:

at least one of a transmitting unit for converting at least one of a data signal and an aural signal into a transmission signal, and a receiving unit for converting a reception signal into at least one of a data signal and an aural signal;

an antenna for transmitting said transmission signal and receiving said reception signal; and a control unit for controlling at least said transmitting unit and said receiving unit, wherein the non-reciprocal circuit device is disposed in one of (i) between said antenna and said transmitting unit, and (ii) an inside of said receiving unit.

* * * * *